US007444228B2

(12) United States Patent
Nakagawa et al.

(10) Patent No.: US 7,444,228 B2
(45) Date of Patent: Oct. 28, 2008

(54) DATA PROCESSOR FOR PROCESSING PIECES OF DATA BEING SUCCESSIVELY SAMPLED AT INTERVALS

(75) Inventors: Hironari Nakagawa, Nagoya (JP); Masayuki Kaneko, Kariya (JP); Yoshiharu Takeuchi, Kariya (JP); Tsutomu Nakamura, Kariya (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 0 days.

(21) Appl. No.: 11/896,940

(22) Filed: Sep. 6, 2007

(65) Prior Publication Data

US 2008/0059045 A1 Mar. 6, 2008

(30) Foreign Application Priority Data

Sep. 6, 2006 (JP) ............................ 2006-241580

(51) Int. Cl.
*G06F 19/00* (2006.01)
*F02D 45/00* (2006.01)

(52) U.S. Cl. ...................................... 701/102; 701/115

(58) Field of Classification Search ................. 701/102, 701/114, 115; 710/22–24
See application file for complete search history.

(56) References Cited

U.S. PATENT DOCUMENTS 4,750,154 A * 6/1988 Lefsky et al. ............... 711/108
4,787,041 A * 11/1988 Yount .......................... 701/33
5,738,074 A 4/1998 Nakamura et al.
5,740,325 A * 4/1998 Wang .......................... 706/16
5,778,857 A 7/1998 Nakamura et al.
7,079,936 B2 7/2006 Honda
7,293,119 B2 * 11/2007 Beale .......................... 710/22
2005/0120281 A1 6/2005 Takatori et al.

FOREIGN PATENT DOCUMENTS

| | | |
|---|---|---|
| JP | 09-273437 | 10/1997 |
| JP | 11-249714 | 9/1999 |
| JP | 2001-200747 | 7/2001 |
| JP | 2002-366507 | 12/2002 |
| JP | 2005-149401 | 6/2005 |
| JP | 2005-220796 | 8/2005 |

* cited by examiner

*Primary Examiner*—Hieu T Vo
(74) *Attorney, Agent, or Firm*—Nixon & Vanderhye PC

(57) ABSTRACT

In a data processor for processing pieces of input data successively sampled, a memory unit and a plurality of data transferring units for transferring data are provided. Each of the plurality of data transferring units has an upper limit number of data items successively transferable when activated. An activating unit is provided. The activating unit is configured to successively activate, within a predetermined time frame, the data transferring units without all of the data transferring units being deactivated within the predetermined time frame to thereby successively transfer the pieces of input data to the memory unit so as to store the pieces of input data therein.

14 Claims, 11 Drawing Sheets

DATA PROCESSOR FOR PROCESSING PIECES OF DATA BEING SUCCESSIVELY SAMPLED AT INTERVALS

BACKGROUND OF THE INVENTION

1. Cross Reference to Related Applications

This application is based on Japanese Patent Application 2006-241580 filed on Sep. 6, 2006. This application aims at the benefit of priority from the Japanese Patent Application, so that the descriptions of which are all incorporated herein by reference.

2. Field of the Invention

The present invention relates to data processors for processing pieces of data being successively sampled at intervals.

3. Description of the Related Art

In engine control, cylinder pressure sensors, in other words, combustion pressure sensors, are installed in respective cylinders of an internal combustion engine. The cylinder pressure sensors work to measure individual pressures in the respective cylinders. Based on the measured individual pressures in the respective cylinders, proper ignition timings and air-fuel ratios (A/F ratios) for the respective cylinders are achieved. Such engine control using the pressures in respective cylinders are disclosed in U.S. Pat. No. 5,738,074 corresponding to Japanese Unexamined Patent Publication No. H09-273437.

Especially, in a diesel engine, individual pressure signals indicative of pressures in respective cylinders measured by the corresponding cylinder pressure sensors are sent therefrom.

Based on the sampled individual pressure signals, referred to CPS signals hereinafter, indicative of the pressures in the respective cylinders, combustion timings for the respective cylinders and combustion states are computed.

Fuel injection timings by injectors for the respective cylinders and fuel injection quantities therefrom are fed back and controlled to match them with the corresponding expected combustion timings and the combustion states. The feedback control can provide effective diesel engines with high output and low emissions.

In addition, the CPS signals are used to detect misfiring and/or knocking in a cylinder of an engine (internal combustion engine).

When such CPS signals are used to control an internal combustion engine, it is preferable to sample discrete values from each of the CPS signals with a high frequency that allows the waveform of each of the CPS signals to be traced.

Then, in engine control, the CPS signal values are sampled every short interval corresponding to crank angle (CA) of 1 degree; this crank angle represents a rotational angle of a crankshaft of an internal combustion engine.

On the other hand, an engine control unit is operative to activate actuators including fuel injectors in synchronization with the rotation of a crankshaft of an engine.

Especially, an engine control unit disclosed in Japanese Unexamined Patent Publication No. 2001-200747 utilizes a rotation signal, which is also called as a crank signal or NE signal generated by a crankshaft sensor. The rotation signal consists of an array of crank pulses corresponding to angular positions of a crankshaft as it rotates. The pulse cycle of the pulse train corresponds to a predetermined angular interval of the crankshaft rotation, such as a predetermined crank angle (CA) of, for example, 10 degrees.

The engine control unit is operative to multiply the frequency of the rotation signal, thereby generating a multiplication clock signal. For details, the multiplication clock signal consists of an array of clock pulses whose clock cycle is a positive integral submultiple of the pulse cycle of the rotation signal. In other words, the clock cycle of the clock pulses of the multiplication clock signal is defined by dividing the pulse cycle of the rotation signal by a multiplication number.

The engine control unit is also operative to increment an angular counter indicative of the crank angle of the crankshaft every clock cycle of the multiplication clock signal. The engine control unit is further operative to control the engine based on the count value of the angular counter in synchronization with the rotation of the engine's crankshaft (the engine speed). The configuration of the engine control unit makes it possible to grasp the crank angle with a resolution that is the multiplication-number times as high as that of the rotation signal.

As means for generating the multiplication clock signal, the engine control unit is provided with an edge time interval measuring counter, an edge time storing unit, and a multiplication counter.

The edge time interval measuring unit is configured to measure a time interval between each significant pulse edge of the rotation signal corresponding to each of the predetermined crank angles.

The edge time storing unit is configured to divide, by a multiplication number N, each time interval measured by the edge time interval measuring counter in response to when each significant pulse edge appears in the rotation signal, thereby storing the divided time intervals.

The multiplication counter is configured to generate pulses as the multiplication clock signal whose pulse cycle corresponds to each of the divided time intervals stored in the edge time storing unit.

Specifically, a pulse cycle of the multiplication clock signal ranging from a current significant pulse edge of the rotation signal to a next significant pulse edge thereof is determined based on a current time interval between the current significant pulse edge of the rotation signal and a previous significant pulse edge thereof.

When the CPS signal for one cylinder of the engine as an example is sampled at regular time intervals corresponding to an angular interval of 1 degree crank angle, for using it to control an engine, each of the sampling timings can be generated based on a count value of an angular counter. The angular counter works to count up by 1 every a significant edge, i.e., either rising or falling edge in the multiplication clock signal appears.

For example, an analog value of the CPS signal is sampled every time the count value of the angular counter increases by a value corresponding to the crank angle of 1 degree to be converted into a piece of digital data (CPS data). The converted pieces of CPS data are stored in a memory.

In the method of sampling an analog value of the CPS signal at the timing of appearance of a significant edge in the multiplication clock signal, the sampling timings may depend on variations in the rotational speed of the crankshaft (engine speed).

Specifically, the cycle of the multiplication clock signal is determined based on a current time interval between the current significant pulse edge of the rotation signal and a previous significant pulse edge thereof. For this reason, if the engine speed varies abruptly, the count value of the angular counter may have an error. This may cause pieces of CPS data sampled based on the count value of the angular counter to be unmatched with corresponding pieces of CPS data that can be actually obtained every time the crankshaft rotates at a constant minute angle.

For the purpose of improving the sampling precision, the applicant's U.S. Pat. No. 7,079,930 corresponding to Japanese Unexamined Patent Publication No. 2005-220796 discloses an apparatus for sampling a CPS signal for a cylinder outputted from a cylinder pressure sensor.

Within a predetermined time frame (data collecting period), the apparatus samples the value of the CPS signal every constant time interval shorter than a minimum one cycle of a pulse array of a pulse signal whose pulse appears each time the crankshaft rotates at a predetermined angle. The apparatus successively converts the sampled values into pieces of digital data and stores them in the memory of the apparatus.

In addition, the apparatus measures a start time when the sampling is executed for the fast time and edge times when significant edges respectively appear in the pulse signal.

Based on the measured start time, the measured edge times, the constant time interval (sampling interval), and the A/D converted pieces of digital data, the apparatus properly obtains digital items of the CPS signal whose intervals respectively correspond to constant angular intervals of the rotation of the crankshaft; each of these angular intervals is lower than the predetermined angle.

These properly obtained A/D converted pieces of data of the CPS signal enable the efficiency of engine control requiring them to improve.

On the other hand, a circuit module capable of operating independently of software-based tasks by a CPU (Central Processing Unit) has been installed in recent microcomputers used for control of automobiles.

Specifically, the circuit module is provided with an ADC (Analog-to-Digital converter) working to convert an input analog signal into a digital sample every constant time interval. The circuit module is also provided with a digital filter working to obtain digital samples that lie within the desired frequency range.

In addition, the circuit module is provided with a DMA (Direct Memory Access) transferring unit, in other words, DMA controller, working to successively transfer the individual digital samples filtered by the digital filter which is independent of the CPU into the memory of the data microprocessor.

The implementation of the techniques disclosed in the U.S. Pat. No. 7,079,930 set forth above using a microcomputer in which such a circuit module has been installed allows:

the sampling and A/D converting of the CPS signal every constant time interval; and the transferring of the A/D converted pieces of digital data to the memory independently of the operations of the CPU. This makes it possible to reduce the CPU load.

Many DMA transferring units to be installed in microcomputers have an upper limit to the number of digital samples that each of the transferring units can successively transfer.

Let us consider a microcomputer in which only DMA transferring units is configured to implement the techniques disclosed in the U.S. Pat. No. 7,079,930 set forth above.

In this case, it is assumed that the number of digital samples, which should be taken from an input signal, such as the CPS signal, every constant time interval within the predetermined data collecting period and are required to implement the techniques, is greater than the upper limit of the number of digital samples that the DMA transferring unit can successively transfer.

In this assumption, because all of the digital samples required to implement the techniques cannot be stored in the memory, it may be difficult to obtain the number of pieces of digital data, such as pieces of CPS data, which are required to implement the techniques.

SUMMARY OF THE INVENTION

In view of the background, an object of at least one aspect of the present invention is to provide data processors each with a data-transferring unit. The data-transferring unit of each of the data processors has an upper limit number of pieces of data successively transferable when activated. The provided data processors are capable of transferring a plurality of pieces of data even if the upper limit is less than the number of pieces of data.

According to one aspect of the present invention, a data processor is provided for processing pieces of input data successively sampled. The data processor includes a memory unit, and data transferring units for transferring data. Each of the data transferring units has an upper limit number of data items successively transferable when activated. The data processor includes an activating unit configured to successively activate, within a predetermined time frame, the data transferring units without all of the data transferring units being deactivated within the predetermined time frame to thereby successively transfer the pieces of input data to the memory unit so as to store the pieces of input data therein.

According to another aspect of the present invention, a data processor is provided for processing pieces of engine control data successively sampled at constant intervals. The constant intervals are determined to be associated with a rotation angle of a crankshaft of an engine. The data processor includes a memory unit, and data transferring units for transferring data. Each of the data transferring units has an upper limit number of data items successively transferable when activated. The data processor includes an activating unit configured to successively activate, within a predetermined time frame, the data transferring units without all of the data transferring units being deactivated within the predetermined time frame to thereby successively transfer the pieces of engine control data to the memory unit so as to store the pieces engine control data therein.

According to a further aspect of the present invention, an engine control unit is provided. The engine control unit includes the data processor according to another aspect of the invention, and a controller configured to control an engine based on the pieces of engine control data stored in the memory unit.

According to a still further aspect of the present invention, a software program stored in a media accessible by a computer accessible to a memory unit and to data transferring units is provided. The computer works to process pieces of engine control data successively sampled at constant intervals. The constant intervals are determined to be associated with a rotation angle of a crankshaft of an engine. Each of the data transferring units has an upper limit number of data items successively transferable when activated. The software program contains codes for instructing the computer to successively activate, within a predetermined time frame, the data transferring units without all of the data transferring units being deactivated within the predetermined time frame to thereby successively transfer the pieces of engine control data to the memory unit. The software program also contains codes for instructing the computer to store the pieces engine control data in the memory unit.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

In the embodiment, the present invention is applied to an engine electronic control unit (engine ECU) 1 installed in a vehicle for controlling, as a target device, a diesel engine 10 thereof. The diesel engine 10 is an example of various types of internal combustion engines.

Figure 1:
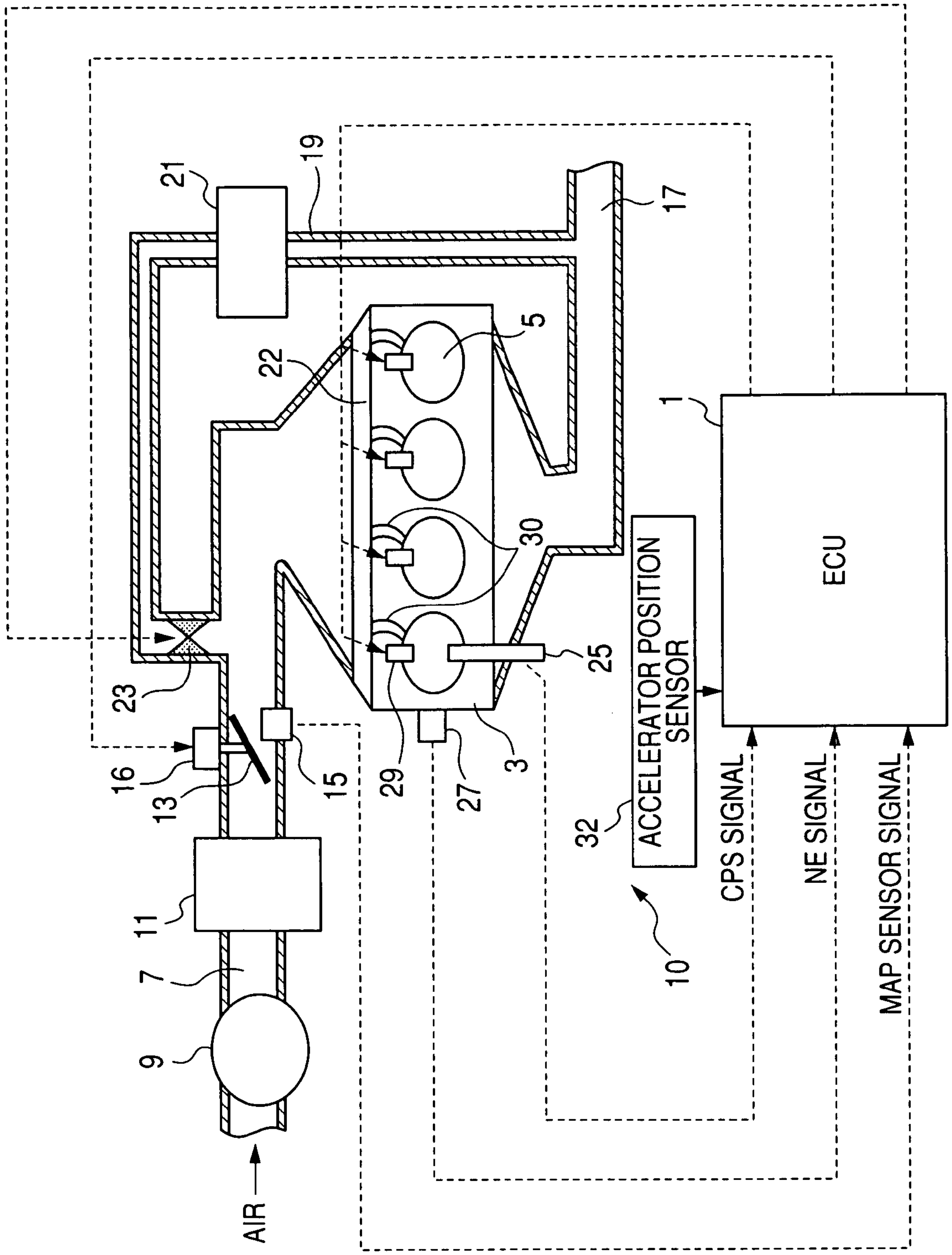
FIG. 1 is a view schematically illustrating an example of the structure of an engine electronic control unit (engine ECU) and a diesel engine according to an embodiment of the present invention.

Referring to FIG. 1, the diesel engine 10 is equipped with a plurality of, for example four, inner follow cylinders 5 each consisting of a combustion chamber. The combustion chamber of each cylinder 5 C is formed with an intake port and an exhaust port (not shown).

The diesel engine 10 is equipped with an intake passage (intake manifold) 7 into which air can enter. The intake passage 7 is connected to the combustion chamber of each cylinder 5 via the intake port.

The diesel engine 10 is equipped with a compressor 9 of a turbocharger, an intercooler 11, a throttle valve 13, a motor 16, and a MAP (Manifold Absolute Pressure) 15, which are disposed in the intake passage 7 from its upstream to its downstream.

When driven by, for example, a turbine of the turbocharger, the compressor 9 works to compress intake airflow entering it.

The intercooler 11 works to cool the compressed intake air, so the cooled intake air is transferred to the throttle valve 13.

The throttle valve 13 is rotatably disposed in the intake passage 7. The motor 16 serves as an actuator which works to rotatably drive the throttle valve 13.

Specifically, when energized, the motor 16 rotates the throttle valve 13 in the passage opening direction or the passage closing direction. This allows the opening of the intake passage 7 to be adjusted.

The adjustment of the opening of the intake passage 7 can control the amount of the intake air to be supplied to each of the combustion chambers of the cylinders 5.

The MAP sensor 15 works to measure the absolute pressure and the mass of the intake air flowing therethrough and to output the measured absolute pressure and mass of the intake air as a map sensor signal.

The diesel engine 10 is equipped with an intake valve (not shown) for each cylinder 5. The intake valve is disposed in the intake port and operative to open, which allows airflow through the intake passage 7 to be fed into the combustion chamber of each cylinder 5. In contrast, the intake valve is operative to close, which prevents airflow through the intake passage 5 from being fed into the combustion chamber of each cylinder 5.

The diesel engine 10 is equipped with a common rail 22 connected to the combustion chambers of the cylinders 5, and a plurality of, for example, four injectors 29 installed at its one distance ends in the respective combustion chambers of the cylinders 5.

The common rail 22 serves as an accumulator shared by the cylinders 5. Specifically, the common rail 22 is operative to accumulate fuel delivered from a fuel pump (not shown) therein with its pressure kept high.

The common rail 22 is also operative to uniformly feed the high-pressurized fuel accumulated therein to the individual injectors 29 via respective high-pressure fuel passages 30.

This allows each of the injectors 29 to directly meter the high-pressurized fuel into a corresponding one of the combustion chambers of the cylinders 5. As a result, air contained in the combustion chamber of each of the cylinder 5 and the high-pressurized fuel metered thereinto are mixed to each other. The mixture of air and high-pressurized fuel in the combustion chamber of each cylinder 5 is subjected to combustion, which generates power to rotate a crankshaft of the diesel engine 10.

In addition, the diesel engine 10 is equipped with an exhaust passage 17 connected to the combustion chamber of each cylinder 5 via an exhaust valve not shown). The exhaust valve is operative to open to permit a diesel exhaust gas ejected from the combustion chamber of each cylinder 5 to pass therethrough.

The diesel engine 10 is equipped with an EGR (Exhaust Gas Recirculation) passage 19, an EGR cooler 21, and an EGR valve 23.

The EGR passage 19 is communicably coupled to part of the intake passage 7 downstream of the throttle valve 13 and to part of the exhaust passage 17. The EGR passage 19 allows part of the exhaust gas from the exhaust passage 17 to be returned toward the intake passage 7 at the downstream of the throttle valve 13.

The EGR valve 23 is disposed in the EGR passage 19 downstream of the second intercooler 21.

The EGR valve 23 works to open or close, allowing the opening of the EGR passage 19 to be adjusted.

The adjustment of the opening of the EGR passage 19 can control the amount of exhaust gas to be recirculated from the exhaust passage 17 into the intake passage 7. In other words, the adjustment of the opening of the EGR passage 19 can control the amount of air to enter the intake passage 7.

Moreover, the diesel engine 10 is equipped with a number of, such as four, cylinder pressure sensors 25 respectively provided for the cylinders 5. In order to simplify the explanations of the engine 10, the cylinder pressure sensor 25 provided for one of the cylinders 5 is only illustrated in FIG. 1, but the remaining sensors 25 are similarly provided for the remaining cylinders 5, respectively.

For example, each of the cylinder pressure sensors 25 has a pressure-sensitive element installed in a corresponding one of the cylinders 5. The pressure-sensitive element works to generate, as a cylinder pressure sensor signal (CPS signal), an electric signal indicative of a pressure applied thereto as a pressure in the corresponding one of the cylinders 5.

Each of the cylinder pressure sensor 25 works to output and generate cylinder pressure signal (CPS signal).

The diesel engine 10 is also equipped with a crank angle sensor 27. For example, the crank angle sensor 27 includes a reluctor disc (signal rotor) having a plurality of teeth substantially spaced at angular intervals around the periphery of the disc. The reluctor disc is for example coaxially mounted on the crankshaft of the diesel engine 10 as the engine's main shaft for delivering rotary motion taken from reciprocating pistons and rods of the cylinders 5.

The crank angle sensor 27 for example includes a pickup operative to, for example, magnetically detect the teeth of the reluctor disc on the crankshaft as it rotates to generate a rotational signal, referred to as "NE signal" based on the detection result.

Specifically, the level of the NE signal changes in a predetermined same direction in a pulse every time the crankshaft (the reluctor disc) rotates at a unit angle of, for example, 10 degrees crank angle (CA). In the embodiment, for example, the predetermined same direction is set to a low-to-high direction.

Figure 3:
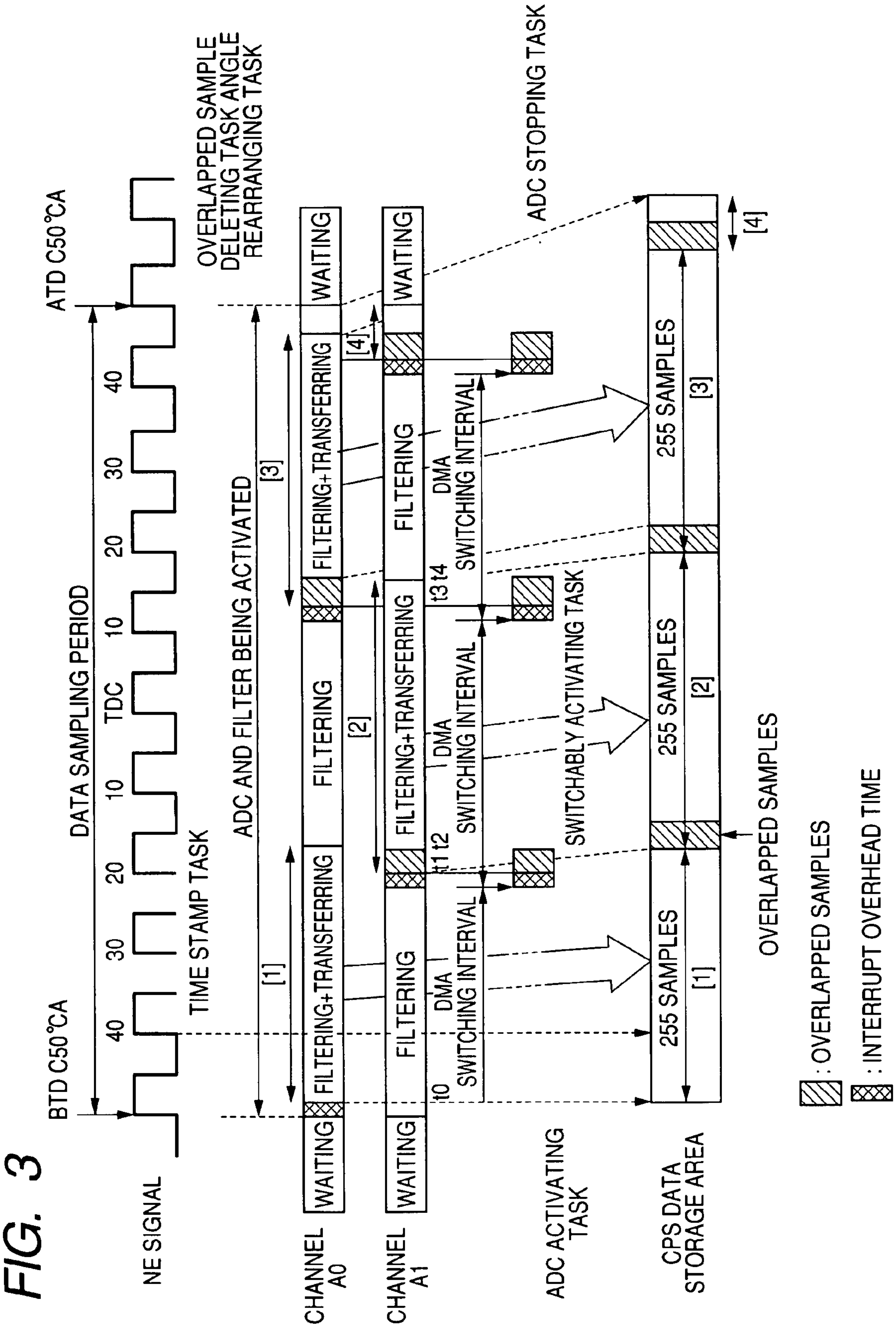
FIG. 3 is a timing chart schematically illustrating operation timings of a CPU of a microcomputer of the engine ECU and first and second DMA channels of the microcomputer illustrated in FIG. 2.

In other words, a significant edge, such as a rising edge, of the transient level change of the NE signal in a pulse appears every time the crankshaft rotates at the crank angle of 10 degrees (see the first stage (top stage) of FIG. 3).

The diesel engine 10 is further equipped with an accelerator position sensor 32. The accelerator position sensor 32 is disposed close to or attached to an accelerator pedal of the vehicle. The accelerator position sensor 32 works to detect an actual position and/or an actual stroke of the accelerator pedal depressed by the driver, and output an electric signal indicative of the detected position and/or stroke of the accelerator pedal.

The ECU 1 is operative to:

receive the measurement signals outputted from the MPS sensor 15, the cylinder pressure sensors 25, and the crank angle sensor 27; and drive, based on the received measurement signals, each of the injectors 29, the EGR valve 23, and the motor 16, thus controlling a timing and a quantity of injection of each of the injectors 29, and the amount of exhaust gas to be recirculated from the exhaust passage 17 into the intake passage 7.

Particularly, the ECU 1 works to detect a timing of ignition of an injector 29 corresponding to a cylinder 5 during its combustion cycle based on the received CPS signal outputted from the cylinder pressure sensor 25. Then, the ECU 1 works to control the drive of the EGR valve 23 and the drive of an injector 29 corresponding to a cylinder 5 during its combustion cycle.

The ECU 1 also works to drive the motor 16 to rotate the throttle valve 13 based on the received measurement signal indicative of the detected position and/or stroke of the accelerator pedal outputted from the accelerator position sensor 32 and the like, thus controlling the amount of air to be supplied into the combustion chambers therethrough.

Next, an example of part of the structure of the ECU 1 associated with the handling of the CPS signals will be described hereinafter.

Figure 2:
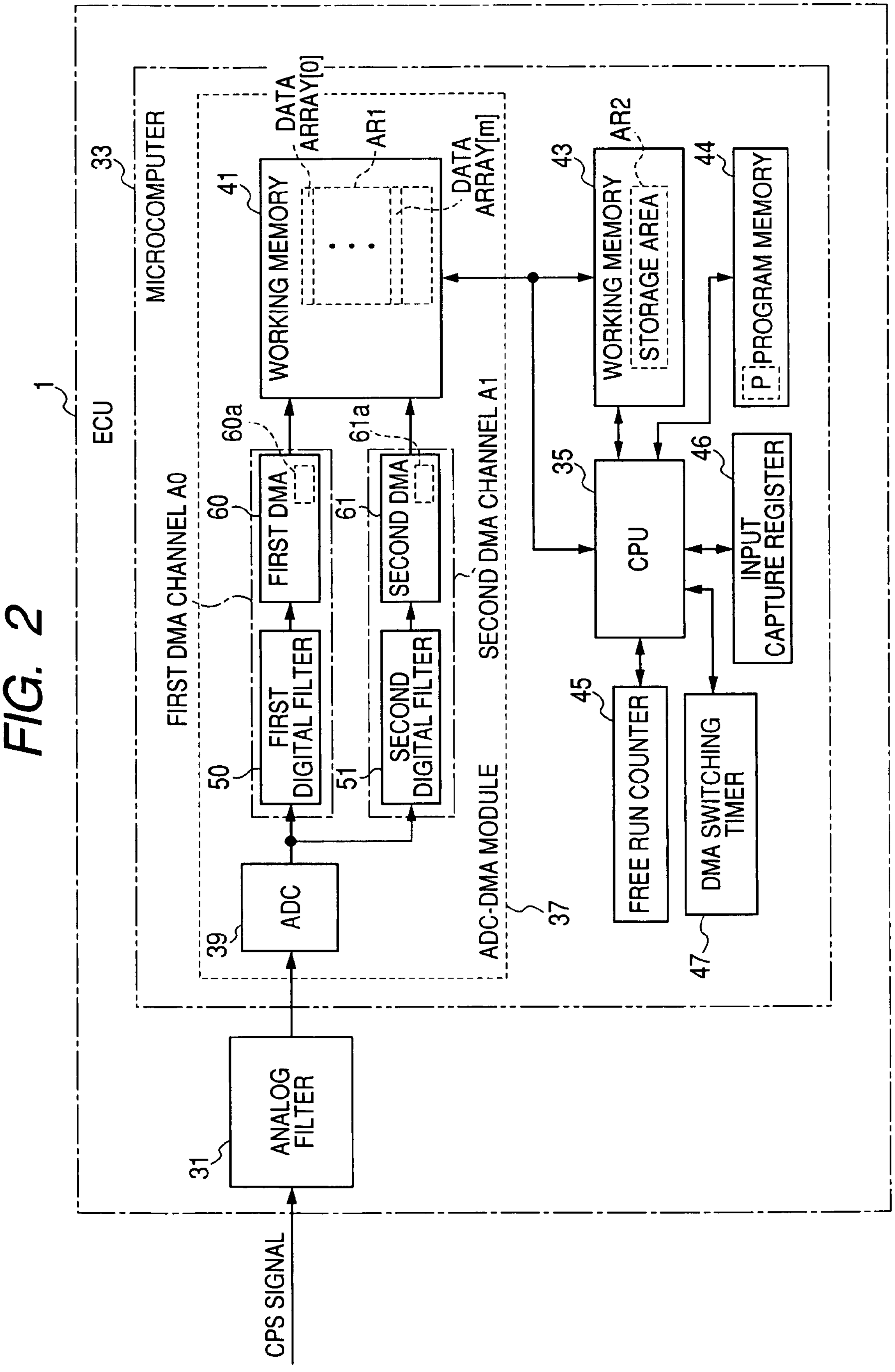
FIG. 2 is a block diagram schematically illustrating an example of the structure of the engine ECU illustrated in FIG. 1.

Referring to FIG. 2, the ECU 1 is provided with an analog filter 31 to which the CPS signal sent from each cylinder pressure sensor 25 is configured to be input, and with a microcomputer 33 into which the CPS signal sent from each cylindrical pressure sensor 25 and passing through the analog filter 31 is input.

In the embodiment, for example, noise components whose frequencies resonant with the pressure-sensitive element of each of the cylinder pressure sensors 25 are easily superimposed on the CPS signal.

Thus, the microcomputer 33 has a function of:

sampling discrete values from each of the CPS signals at, for example, regular timings (sampling intervals) to convert each of the individual sampled values into a digital sample (a piece of CPS data); and working to obtain digital samples that lie within a predetermined frequency range.

For this reason, in order to remove aliasing components from each of the CPS signals to be input to the microcomputer 33, the analog filter 31 functions as, for example, an anti-aliasing filter.

The microcomputer 33 consists of a CPU 35, a working memory, such as a RAM, 43, and an ADC-DMA module 37, which are communicably linked to each other. The microcomputer 33 also consists of a program memory, such as a ROM, 44, a free run timer 45, an input capture register 46, and a DMA switching timer 47. The free run timer 45, the input capture register 46, and the DMA switching timer 47 can be designed as hardware devices separated from the CPU 35, or as software devices installed therein. In addition, the free run timer 45, the input capture register 46, and the DMA switching timer 47 can be designed by using general-purpose registers of the CPU 35.

Various control programs P required to execute various tasks associated with control of the diesel engine 10 have been installed in the program memory 44.

The ADC-DMA module 37 is capable of operating independently of the CPU's operations in accordance with programs installed in the program memory 44.

The CPU 35 works to execute the various tasks based on the various control programs P.

The working memory 43 works to temporarily store data representing processing results of the CPU 35 and/or at least one of the programs P to be run.

Referring to FIG. 2, the ADC-DMA module 37 includes an analog-to-digital (A/D) converter (ADC) 39, a working memory 41, first and second digital filters 50 and 51, and first and second DMA (Direct Memory Access) transferring units 60 and 61. The A/D converter 39, the working memory 41, the first and second digital filters 50 and 51, and the first and second DMA transferring units 60 and 61 are communicably coupled to the CPU 35. The connections between the CPU 35 and each of the components of the ADC-DMA module 37 are omitted for the sake of simplification.

The A/ D converter 39 has an input terminal electrically connected to an output of the analog filter 31, and an output terminal electrically connected to an input terminal of the first digital filter 50 and to that of the second digital filter 51.

The A/D converter 39 is operative to sample discrete values from each of the CPS signals passing through the analog filter 31 at, for example, constant time intervals (sampling intervals) so as to convert each of the individual sampled values into a digital sample (a piece of CPS data). Each of the constant time intervals represents a period for sampling each of the CPS signals.

The A/D converter 39 is also operative to successively generate the individually converted digital samples to each of the first and second digital filters 50 and 51.

The first digital filter 50 works to:

receive the data sequence of the digital samples generated by the A/D converter 39; and obtain digital samples that lie within a first predetermined frequency range from the received data; this first predetermined frequency range depends on a plurality of predetermined first filter coefficients.

Similarly, the second digital filter 51 works to:

receive the data sequence of the digital samples generated by the A/D converter 39; and obtain digital samples that lie within a second predetermined frequency range from the received data.

The second predetermined frequency range depends on a plurality of predetermined second filter coefficients; this predetermined second filter coefficients are identical to the predetermined first filter coefficients, respectively. This allows the first and second frequency ranges to be identical to each other, enabling the first and second digital filters 50 and 51 to output the selected same digital samples being within the same frequency range.

The first DMA transferring unit, referred to simply as "first DMA" 60 is operative to successively transfer, to the working memory 41, the individual digital samples filtered by the first digital filter 50 independently of the CPU 35.

Similarly, the second DMA transferring unit, referred to simply as "second DMA", 61 is operative to successively transfer, to the working memory 41, the individual digital samples filtered by the second digital filter 51 independently of the CPU 35.

As described above, in the embodiment, the first and second filter coefficients are identical to each other, so the first and second frequency ranges are identical to each other. This enables the same digital samples being within the same frequency range to be input to the first and second DMAs 60 and 61.

Thus, the microcomputer 33 can be configured such that digital samples filtered out from a single digital filter is input to the first and second DMAs 60 and 61.

In addition, the microcomputer 33 is provided with two pairs of a digital filter and a DMA transferring unit, but it can be provided with three or more pairs of a digital filter and a DMA transferring unit.

The one pair of the first digital filter 50 and the first DMA 60 and the other pair of the second digital filter 51 and the second DMA 61 serve as data channels of a single DMA controller installed in the microcomputer 33. The data channels enable data communications between the working memory 41 and the A/D converter 39 independently of the CPU 35.

Thus, the one pair of the first digital filter 50 and the first DMA 60 and the other pair of the second digital filter 51 and the second DMA 61 will collectively referred to as "DMA channels". In addition, the one pair of the first digital filter 50 and the first DMA 60 will be referred to as "first DMA channel A0", and the other pair of the second digital filter 51 and the second DMA 61 will be referred to as "second DMA channel A1" hereinafter.

The CPU 35 is capable of accessing both the working memories 43 and 41.

The free run timer 45 works to count up continuously. The CPU 35 is programmed to set a count value of the free run timer 45 to the input capture register 46 every time a significant edge, such as a rising edge appears in the NE signal.

Note that, in the embodiment, the constant time interval (sampling interval) between temporally adjacent digital samples corresponding to the period for sampling each of the CPS signals is determined to be shorter than one minimum cycle of the NE signal whose rising edge appears each time the crankshaft rotates at a predetermined angle of, for example, 10 degrees.

Specifically, the constant time interval (sampling interval) between temporally adjacent digital samples corresponding to the period for sampling each of the CPS signals can be determined to be associated with the number of revolutions, such as the RPM (Revolutions per Minute), of the crankshaft. For example, the constant time interval is set to, for example, 26.7 microseconds (μs) equivalent to 37.5 kilohertz (kHz). If the ECU 1 requires monitoring the engine speed of the diesel engine 10 (the RPM of the crankshaft) at a high frequency range, the period for sampling each of the CPS signals can be set to be shorter depending on the high frequency range.

Next, operations to be executed by the microcomputer 33 will be schematically described hereinafter in accordance with at least one of the programs P stored in the program memory 44.

In the following descriptions, the term "TDC (Top Dead Center)" represents a timing corresponding to a highest point of piston and rod travel in a cylinder 5 at the ends of the combustion cycle of the diesel engine 10.

The term "BTDC 50 degrees CA" represents a timing corresponding to a crank angle of the crankshaft before the TDC by 50 degrees CA, and ATDC 50 degrees CA represents a timing corresponding to a crank angle of the crankshaft after the TDC by 50 degrees CA.

FIG. 3 schematically illustrates a timing chart indicative of operation timings of the CPU 35 and the first and second DMA channels A0 and A1.

Referring to FIG. 3, the microcomputer 3 is programmed to determine a timing of ignition of an injector 29 of a cylinder 5 based on the digital samples. The digital samples have been obtained by the microcomputer 33 for the duration of the rotation of the crankshaft by 80 degrees CA from the timing of BTDC 40 degrees CA to the timing of ATDC 40 degrees CA.

In addition, the digital samples, which have been additionally obtained by the microcomputer 33 for the duration of the rotation of the crankshaft by 10° CA from the timing of BTDC 50 degrees CA to the timing of BTDC 40 degrees CA, are used to record the digital samples corresponding to the duration of the rotation of the crankshaft by 80 degrees CA into a condition of stability.

Similarly, the digital samples, which have been additionally obtained by the microcomputer 33 for the duration of the rotation of the crankshaft by 10° CA from the timing of ATDC 40 degrees CA to the timing of ATDC 50 degrees CA, are used to record the digital samples corresponding to the duration of the rotation of the crankshaft by 80 degrees CA into a condition of stability.

Especially, the additionally obtained digital samples corresponding to the duration of the rotation of the crankshaft by 10 degrees CA from the timing of ATDC 40 degrees CA to the timing of ATDC 50 degrees CA are provided in preparation for the use of, for example, a zero-phase delay filter that allows the phase delay of the digital samples to be compensated.

As set forth above, in the embodiment, a period of time during the rotation of the crankshaft by 100 degrees CA from the timing of BTDC 50 degrees CA to the timing of ATDC 50 degrees CA represents a time frame (data collecting period) for each of the CPS signals.

Each of the first and second DMAs 60 and 61 (the DMA channels) provided in the microcomputer 33 has an upper limit number of digital samples that each of the DMA channels can successively transfer; this upper limit is determined in advance. In the embodiment, the upper limit is set to 255.

The first and second DMAs 60 and 61 (first and second DMA channels A0 and A1) are respectively provided with DMA counters 60*a* and 61*a*.

The DMA counter 60*a* works to count the number of digital samples transferred by the first DMA channel A0 to the working memory 41 since the activation of the first DMA channel A0. Similarly, the DMA counter 61*a* works to count the number of digital samples transferred by the second DMA channel A1 to the working memory 41 since the activation of the second DMA channel A1.

For example, when a first digital sample is transferred by the first DMA channel A0 after it is activated, the initial count value of the DMA counter 60*a* is set to zero. Subsequently, the count value of the DMA counter 60*a* is incremented by 1 each time a digital sample is transferred by the first DMA channel A0 to the working memory 41.

Figure 10:
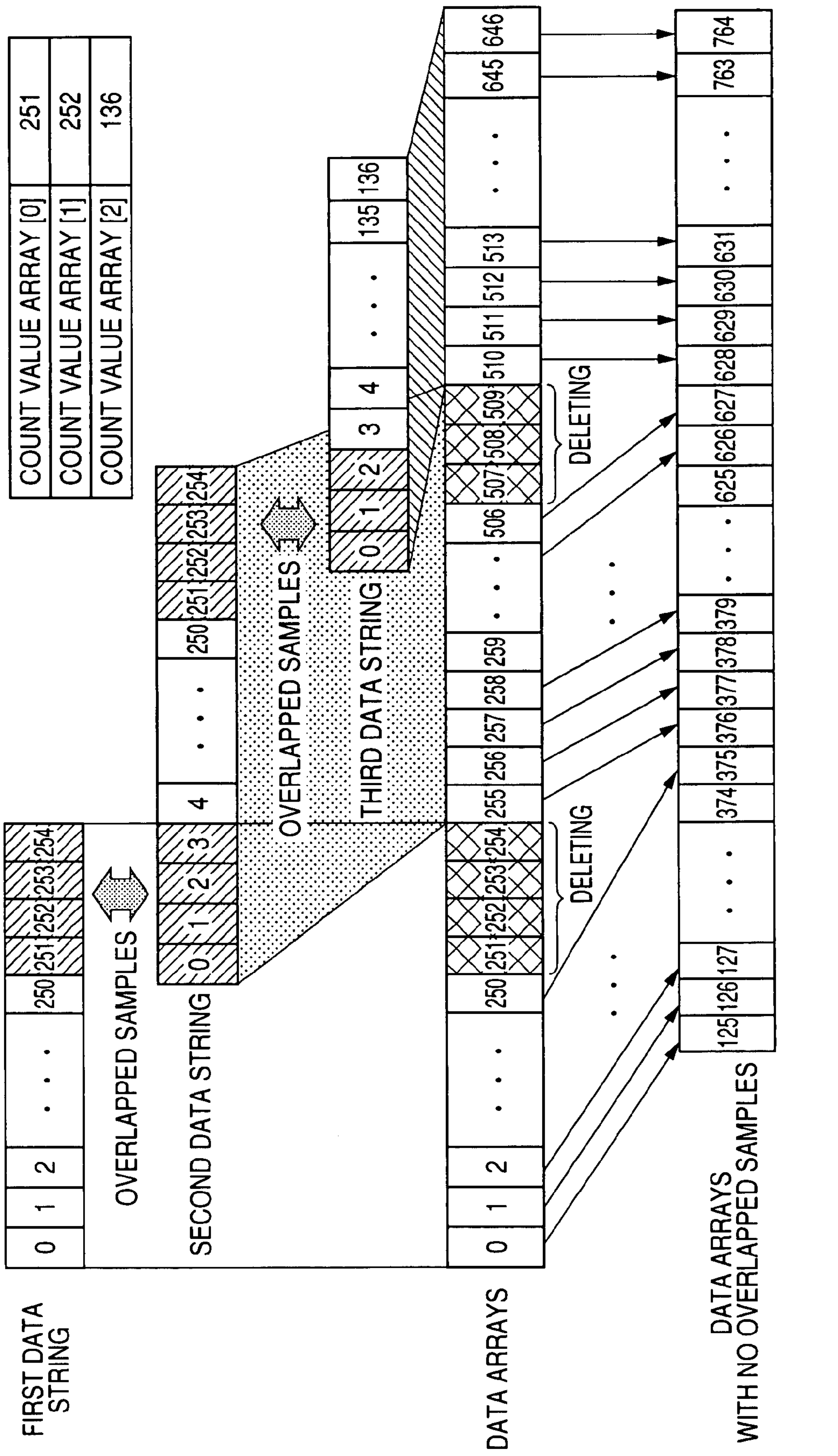
FIG. 10 is a view schematically illustrating an example of relationships between each of first to third data strings to be transferred by the first and second DMA channels and data arrays with overlapped samples stored in a working memory of the microcomputer, and between the data arrays with overlapped samples and data arrays with no overlapped samples according to the embodiment.

When the number of digital samples that have been transferred to the working memory 41 since activation of the first DMA channel A0 reaches the upper limit of 255 so that the count value of the DMA counter 60*a* reaches 254, the first DMA channel A0 works to stop the data-sample transferring operations automatically (see FIG. 10).

The operations of the DMA counter 61*a* are identical to those of the DMA counter 60*a*, and therefore the descriptions of them are omitted.

The count value of each of the DMA counters 60*a* and 61 *a* will be referred to as "DMA count value" hereinafter.

As illustrated in FIG. 3, every time each of the NE signal rises up (a rising edge appears), an NE signal interrupt occurs, at least one of the programs P corresponding to the NE signal interrupt is launched. This allows the CPU 35 to execute an NE interrupt task defined in the software programs P.

Especially, when a rising edge indicative of the timing of BTDC 50 degrees CA appears in each of the NE signals so that the data collecting period is started, a first NE signal interrupt occurs so that at least one of the software programs P corresponding to the first NE signal interrupt is run.

Figure 4:
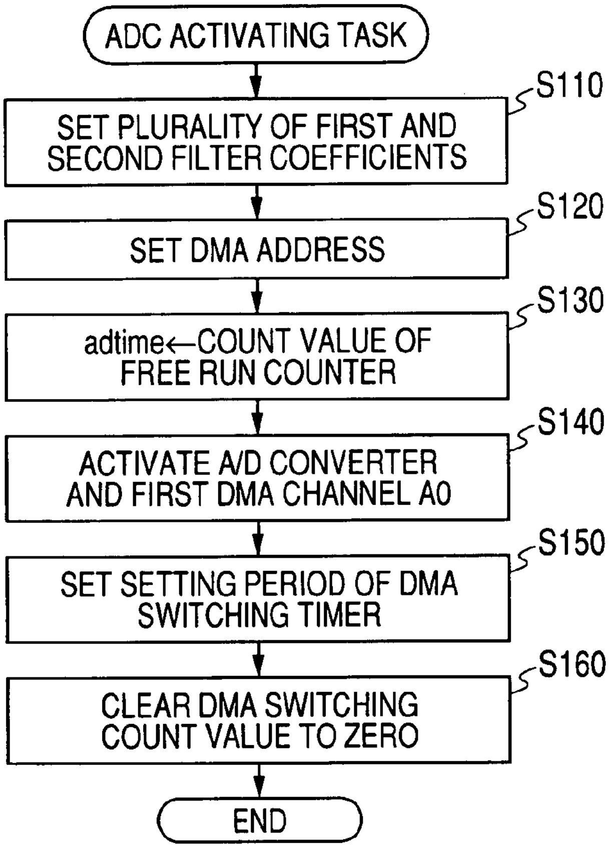
FIG. 4 is a flowchart schematically illustrating an ADC activating task to be executed by the engine ECU according to the embodiment.

This causes the CPU 35 to execute an ADC activating task illustrated in FIG. 4. This allows the A/D converter 39, the first DMA channel A0 (the first DMA 60 and the first digital filter 50), and the second digital filter 51 to be activated at time t0 in FIG. 3 and keeping the second DMA 61 in a stand-by state for activation.

Thereafter, before the number of digital samples, which have been transferred to the working memory 41 since activation of the first DMA channel A0, reaches the upper limit of 255, the second DMA 61 is activated so that the second DMA channel A1 is activated at time t1.

This allows the first and second DMA channels A0 and A1 to be overlappedly activated.

After the activation of the second DMA channel A1, when the number of digital samples, which have been transferred to the working memory 41 since activation of the first DMA channel A0, reaches the upper limit of 255, the first DMA 60 is deactivated at time t2.

Thereafter, before the number of digital samples, which have been transferred to the working memory 41 since activation of the second DMA channel A1, reaches the upper limit of 255, the first DMA 60 is activated so that the first DMA channel A0 is activated at time t3.

This allows the first and second DMA channels A0 and A1 to be overlappedly activated.

After the activation of the first DMA channel A0, when the number of digital samples, which have been transferred to the working memory 41 since activation of the second DMA channel A1, reaches the upper limit of 255, the second DMA 61 is deactivated at time t4.

The alternate activations of the first and second DMA channels A0 and A1 are executed such that the activation duration of the first DMA channel A0 and that of the second DMA channel A1 are partially overlapped with each other.

The string of digital samples to be transferred via the first DMA channel A0 to the working memory 41 and that of digital samples to be transferred via the second DMA channel A1 thereto are stored in different buffers (different locations) as a CPS data storage area AR1 of the working memory 41. The CPS data storage area AR1 is allocated in the working memory 41 for storing the digital samples of each of the CPS signals.

Specifically, in the embodiment, the string of digital samples transferred through the nth DMA channel to be activated after the start timing t0 of the data transferring period will be referred to as the nth data string; n is an integer equal to or greater than 1.

Thus, as illustrated in FIG. 3, the first data string {1} transferred to the working memory 41 is stored in a first address region of the CPS data storage area AR1 of the working memory 41.

The second data string {2} transferred to the working memory 41 is stored in a second address region of the CPS data storage area AR1 of the working memory 41; this second address region is consecutive from the first address region.

The third data string {3} transferred to the working memory 41 is stored in a third address region of the CPS data storage area AR1 of the working memory 41; this third address region is consecutive from the second address region.

As set forth above, each of the number of data strings are sequentially stored in the consecutive address regions of the CPS data storage area AR1 of the working memory 41.

In the embodiment, within the data transferring period, the alternate activations of the first and second DMA channels A0 and A1 while their activation durations are partially overlapped with each other enable the constantly spaced digital samples outputted from the first and second digital filters 50 and 51 to be seamlessly stored in the working memory 41.

When a rising edge indicative of the timing of ATDC 50 degrees CA appears in each of the NE signals so that the data transferring period is terminated, a second NE signal interrupt occurs so that at least one of the programs P corresponding to the second NE signal interrupt is launched.

Figure 7:
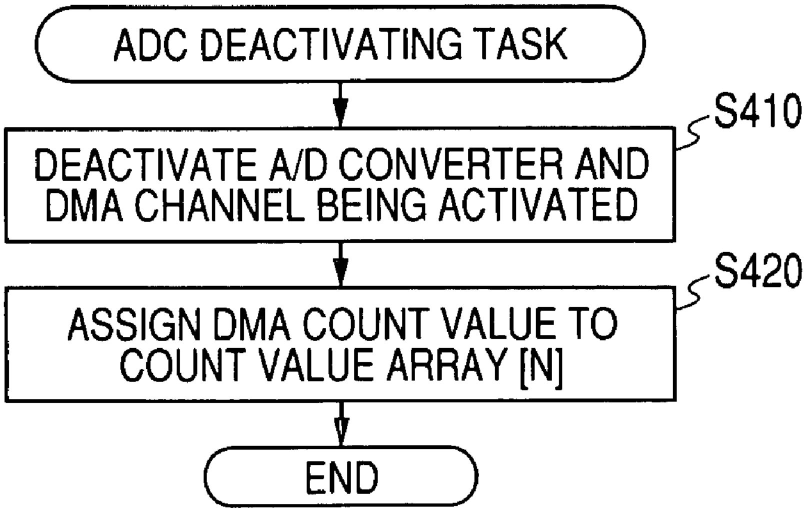
FIG. 7 is a flowchart schematically illustrating an ADC deactivating task to be executed by the engine ECU according to the embodiment.

This causes the CPU 35 to execute an ADC deactivating task illustrated in FIG. 7. This allows the A/D converter 39, the first and second digital filters 50 and 51, and at least one of the first and second DMAs 60 and 61 being currently activated to be deactivated.

Figure 5:
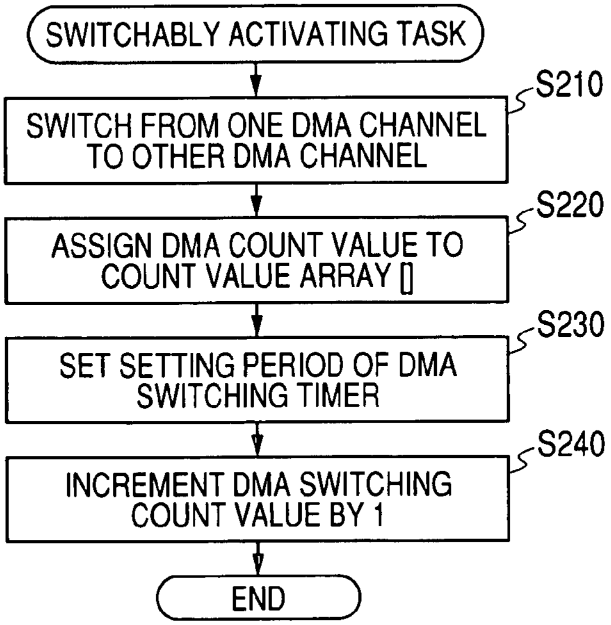
FIG. 5 is a flowchart schematically illustrating an overlapped sample identifiable task to be executed by the engine ECU according to the embodiment.

Each time a timer interrupt occurs, at least one of the programs P corresponding to the first NE signal interrupt is launched, causing the CPU 35 to execute a switchably activating task after the start timing of the data transferring period (see FIG. 5).

The switchably activating task allows a corresponding one of the inactive DMA channels to be executed. "DMA SWITCHING INTERVAL" illustrated in FIG. 3 represents intervals between temporally adjacent timer interrupts.

The alternate activations of the first and second DMA channels A0 and Al while the activation durations of the channels A0 and A1 are partially overlapped with each other provide some pairs of identical digital samples that are overlappedly transferred through the first and second DMA channels A0 and A1 during the overlappedly activated duration to the working memory 41. The overlappedly transferred pairs of identical digital samples are stored in the CPS data storage area AR1 of the working memory 41. In the embodiment, the overlappedly transferred pairs of identical digital samples will be referred to as pairs of overlapped samples hereinafter.

Thus, in the embodiment, the CPU. 35 needs to delete one sample of each pair of the overlapped samples. This one sample of each pair of the overlapped samples will be referred to as overlapped redundant sample hereinafter.

Specifically, in the embodiment, each time a timer interrupt occurs, while executing the switchably activating task, the CPU 35 is programmed to execute an overlapped sample inspection task (see FIG. 5) for enabling the overlapped redundant samples to be located.

Figure 9B:
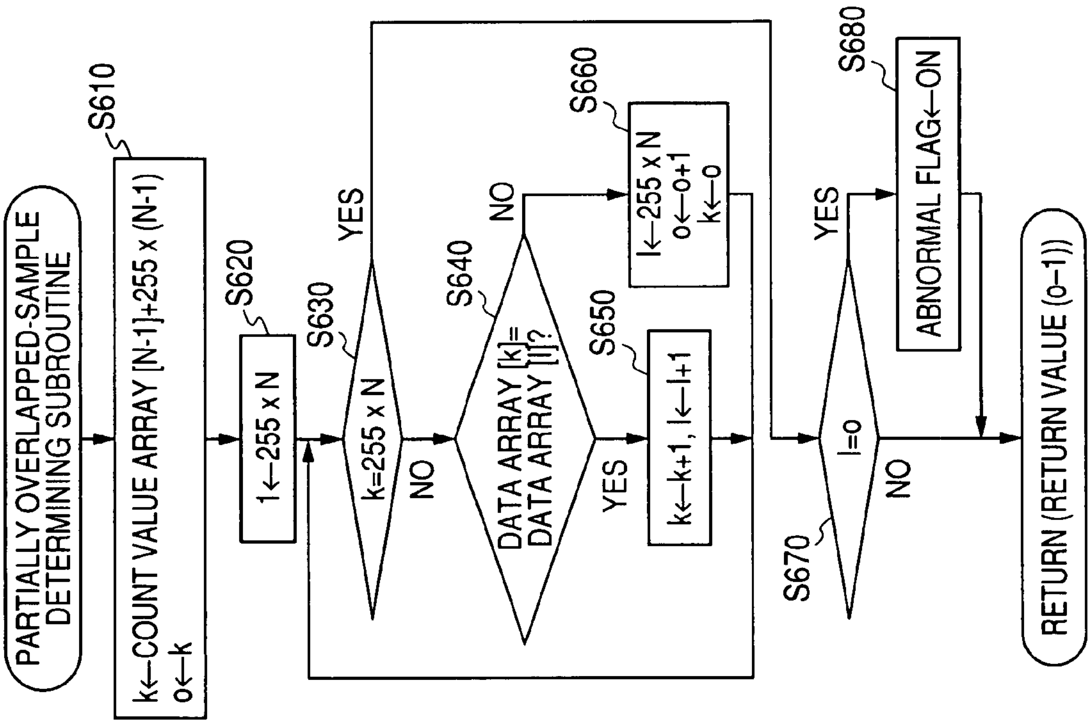
FIG. 9B is a flowchart schematically illustrating a partially overlapped-sample determining task to be executed during execution of the overlapped-sample deleting task according to the embodiment.
Figure 9A:
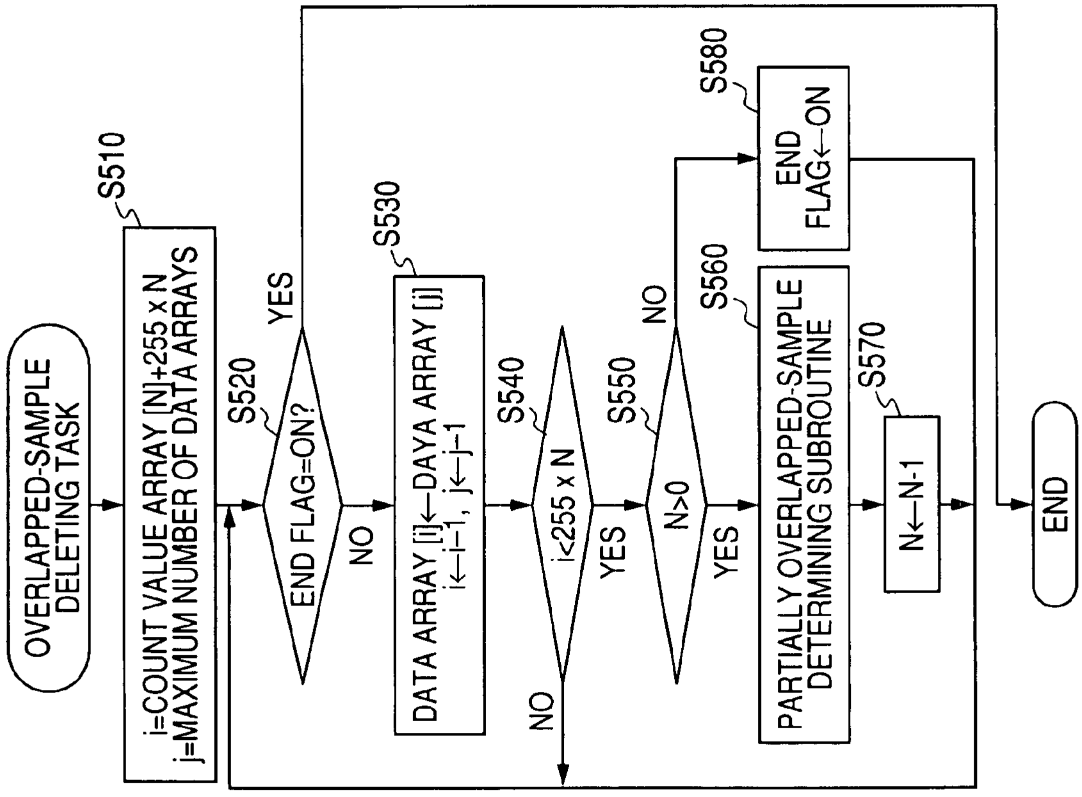
FIG. 9A is a flowchart schematically illustrating an overlapped-sample deleting task to be executed by the engine ECU according to the embodiment.

After the data collecting period, the CPU 35 is programmed to execute an overlapped-sample deleting task illustrated in FIG. 9A to thereby retrieve one sample of each pair of the overlapped samples to delete it.

Figure 12A:
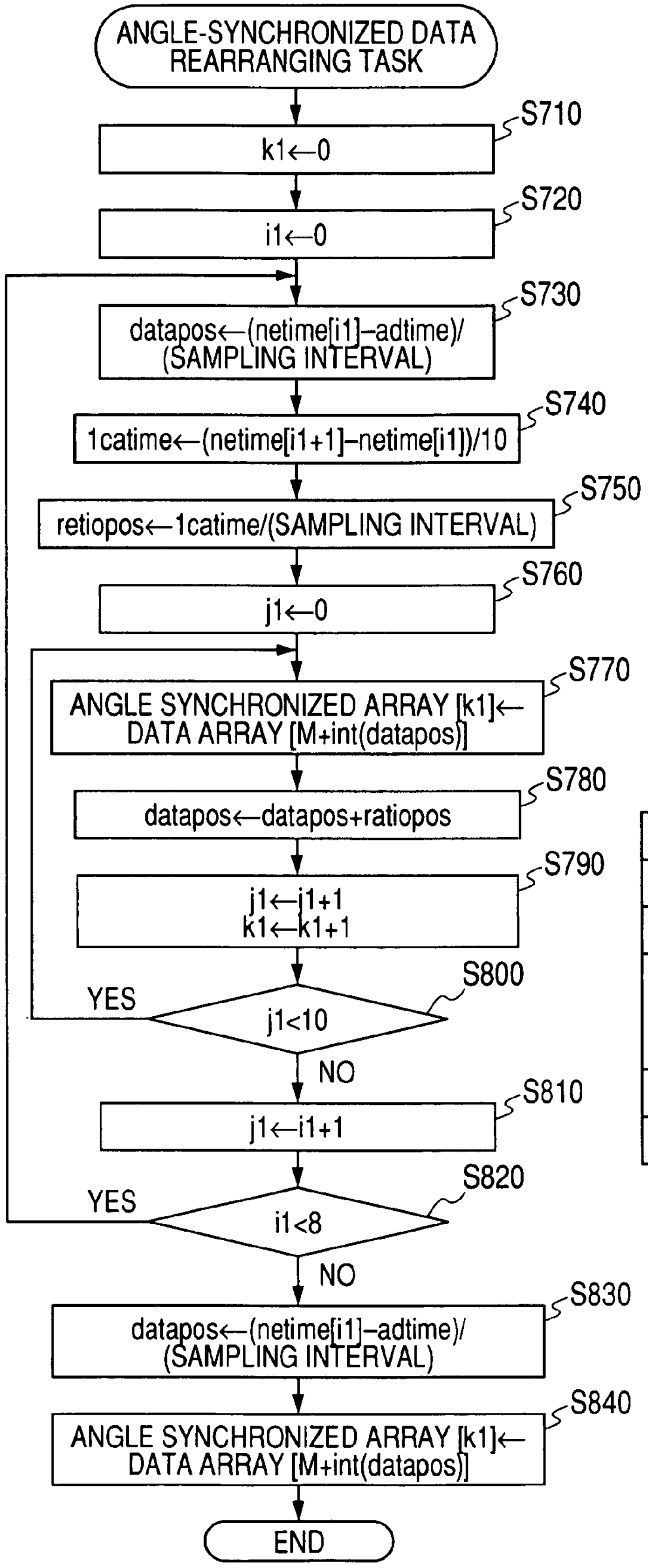
FIG. 12A is a flowchart schematically illustrating angle-synchronized data rearranging task to be executed by the engine ECU according to the embodiment.

In addition, in the embodiment, the CPU 35 is programmed to execute an angle-synchronized data rearranging task illustrated in FIG. 12A based on the digital samples stored in the CPS data storage area AR1 of the working memory 41 after one sample of each pair of the overlapped samples being deleted therefrom. This can obtain pieces of CPS data whose intervals each correspond to the crank angle of 1 degree.

The CPU 35 is also programmed to store the obtained pieces of the CPS data in a storage area AR2 of the working memory 43; this storage area AR2 is allocated in advance in the working memory 43 for storing the pieces of the CPS data.

As a preparation to the angle-synchronized data rearranging task, during execution of the ADC activating task launched at the timing of BTDC 50 degrees CA, the CPU 35 is programmed to store, in the working memory 43, a time when the A/D converter 39 is activated. In other words, the CPU 35 is programmed to store, in the working memory 43, a time value when a digital sample is transferred first from the A/D converter 39 and the first and second digital filters 50 and 51 to the first and second DMAs 60 and 61.

Figure 6:
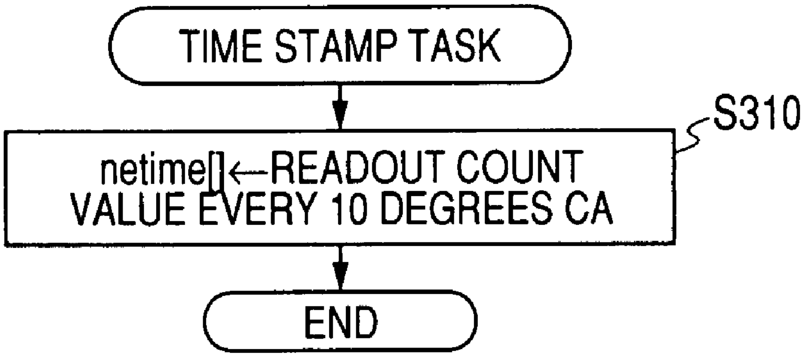
FIG. 6 is a flowchart schematically illustrating a time stamp task to be executed by the engine ECU according to the embodiment.

In addition, within the data collecting period, the CPU 35 is programmed to execute a time stamp task illustrated in FIG. 6 to thereby identifiably store, in the working memory 43, a time value when each rising edge appears in each of the NE signals such that the time value corresponds to which crank angle.

In the embodiment, the CPU 35 is programmed to determine a timing of ignition of an injector 29 of a cylinder 5 based on the pieces of CPS data whose intervals each correspond to the crank angle of 1 degree. The pieces of the CPS data have been obtained for the duration of the rotation of the crankshaft by 80 degrees CA from the timing of BTDC 40 degrees CA to the timing of ATDC 40 degrees CA.

For this reason, the CPU 35 is preferably programmed to identifiably store, in the working memory 43, 9 time values respectively correspond to the rising edges that appear in each of the NE signals from the timing of BTDC 40 degrees CA to the timing of ATDC 40 degrees CA.

In the embodiment, the CPU 35 is programmed to access the free run counter 45 to obtain time values based on each of the NE signals.

Next, the ADC activating task to be executed by the CPU 35 at the timing of BTDC 50 degrees CA in accordance with at least one of the programs P will be described hereinafter with reference to FIG. 4. Note that, as described above, the CPU 35 services the first NE signal interrupt occurring at the timing of BTDC 50 degrees to execute the ADC activating task.

As illustrated in FIG. 4 when starting the ADC activating task, the CPU 35 sets the first filter coefficients to be identical to the second filter coefficients, respectively in step S110.

In step S120, the CPU 35 sets a DMA address in the CPS data storage area AR1. The data string to be transferred via each of the first and second DMA channels A0 and A1 to the working memory 41 is configured to be stored in the CPS data storage area AR1 of the working memory 41 from the set DMA address thereof.

Specifically, the DMA address to be set in step S120 is used for the first DMA channel A0 that will be activated in the next step S140. In step S120, the start address of the first address region of the CPS data storage area AR1 is preferably set as the DMA address.

Next, in step S130, the CPU 35 assigns a current count value of the free run counter 45 to a variable adtime. In step S140, the CPU 35 activates the A/D converter 39, the first DMA channel A0 (the first DMA 60 and the first digital filter 50), and the second digital filter 51 while keeping the second DMA 61 in the waiting state.

The count value of the free run counter 45 assigned to the variable adtime in step S130 therefore shows the time when the A/D converter 39 is activated, which represents the ADC start timing.

In step S 150, the CPU 35 sets a setting period of the DMA switching timer 47, and in step S160, the CPU 35 clears a DMA switching count value to zero, which terminates the ADC activating task.

The DMA switching timer 47 is a timer working to count, when one of the first and second DMA channels A0 and A1 is activated, a period of time up to when the other of the first and second DMA channels A0 and A1 is activated. Specifically, each time the count value of the DMA switching timer 47 reaches the setting period, a timer interrupt occurs. Each time the timer interrupt occurs, the CPU 35 is programmed to start the switchably activating task illustrated in FIG. 5. In the embodiment, the DMA switching timer 47 works to count in microseconds.

The setting period is determined in advance to a period that allows the CPU 35 to, before one of the first and second DMA channels A0 and A1 previously activated completes to transfer 255 digital samples to the working memory 41, start the switchably activating task, thus activating the other of the first and second DMA channels A0 and A1.

Specifically, in the embodiment, the setting period is for example determined in advance to a period of 6,702 microseconds. The setting period of 6,702 (μs), which is equivalent to the product of 26.7 (μs) and 251, allows the CPU 35 to, immediately after one of the first and second DMA channels A0 and A1 previously activated completes to transfer 251 digital samples to the working memory 41, start the switchably activating task, thus activating the other of the first and second DMA channels A0 and A1.

The DMA switching count value represents the number of switching between the first and second DMAs 60 and 61, in other words the number of switching from one currently activated DMA to the other currently inactivated DMA. The DMA switching count value is used by the overlapped-sample deleting task illustrated in FIG. 9A in order to identify one sample of each pair of the overlapped samples after all digital samples are completed within the data collecting period.

Next, the switchably activating task including the overlapped sample identifiable task to be executed by the CPU 35 in accordance with at least one of the programs P will be described hereinafter with reference to FIG. 5. Note that, as described above, each time the timer interrupt occurs, the CPU 35 services the timer interrupt to execute the switchably activating task.

As illustrated in FIG. 5, when starting the switchably activating task, the CPU 35 activates, when one DMA channel (A0 or A1) is being active, the other DMA channel in step S210. In other words, the CPU 35 switches from one DMA channel being activated to the other DMA channel.

In step S210, the CPU 35 also sets a DMA address used for the other inactivated DMA channel in the CPS data storage area AR1.

Specifically, in step S210, the CPU 35 sets, as the DMA address, the address next to an address to which the 255th digital sample is scheduled by the one activated DMA channel to be transferred. In other words, the CPU 35 sets, as the DMA address, the address next to the last address in the first address region of the working memory 41. The 255th digital sample will be stored by the one activated DMA channel in the last address.

Next, in step S220, the CPU 35 assigns the DMA count value of an active DMA counter corresponding to the one activated DMA channel to a count value array [ ].

Note that the square brackets, [and], of the count value array [ ] are used to enclose an array index.

Figure 8A:
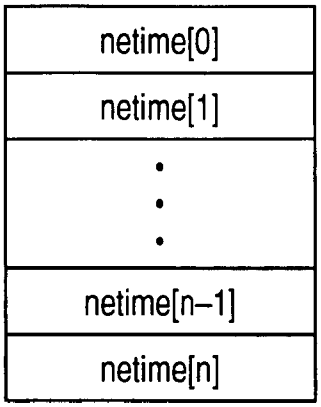
FIG. 8A is a view schematically illustrating an example of the structure of an array of time values according to the embodiment.
Figure 8B:
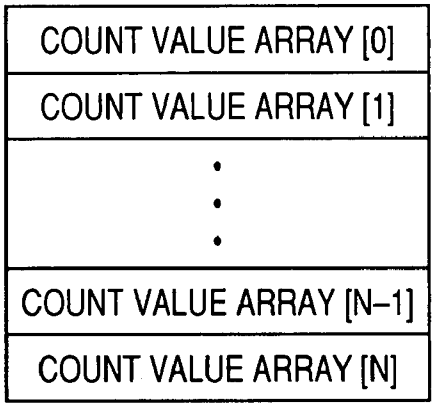
FIG. 8B is a view schematically illustrating an example of the structure of a count value array according to the embodiment.

For example, as illustrated in FIG. 8B, when the switchably activating task is firstly executed after the start timing of the data collecting period, "0" is assigned to the array index enclosed by the square brackets [ ] of the count value array [ ].

When the switchably activating task is executed second after the start timing of the data collecting period, "1" is assigned to the array index enclosed by the square brackets [ ] of the count value array [ ].

Specifically, to the array index of the count value array [ ] enclosed by the square brackets [ ], a numeric value that is incremented from an initial value of "0" by 1 each time the switchably activating task is executed is assigned.

For this reason, the numeric value assigned to the array index of the count value array [ ] enclosed by the square brackets [ ] shows that the DMA count value assigned to the count value array [ ] is transferred by what number DMA channel activated within the data collecting period.

Thus, the CPU 35 checks the numeric value assigned to the array index of the count value array [ ] enclosed by the square brackets [ ], making it possible to identify that the DMA count value assigned to the count value array [ ] is transferred by what number DMA channel activated within the data collecting period.

For example, the DMA count value assigned to the count value array [0] represents a x-th in the first data string {1} transferred by the firstly activated DMA channel A0; this x represents the sum of the DMA count value and 1. This is because, when the x-th in the first data string {1} is transferred by the firstly activated DMA channel A0, the count value of the DMA counter 60*a* represents (x−1).

Similarly, the DMA count value assigned to the count value array [1] represents a y-th in the second data string transferred by the second activated DMA channel A1; this y represents the sum of the DMA count value and 1. This is because, when the y-th in the second data string {2} is transferred by the second activated DMA channel A1, the count value of the DMA counter 61*a* represents (y−1).

The operations in step S220 are executed to store information indicative of where the overlapped redundant samples are started in each of the data strings {1} to {n}.

Subsequently, in step S230, the CPU 35 sets the setting period of the DMA switching timer 47, and in step S240, the CPU 35 increments the DMA switching count value by 1, exiting the alternate activating task.

Next, the time stamp task to be executed by the CPU 35 in accordance with at least one of the programs P will be described hereinafter with reference to FIG. 6. Note that, as described above, the CPU 35 services an interrupt occurring each time the rising edge appears in each of the NE signals within the range from the timing of BTDC 40 degrees CA to the timing of ATDC 40 degrees CA to execute the time stamp task.

As illustrated in FIG. 6, when starting the time stamp task, the CPU 35 reads the count value of the free run timer 45 being set to the input capture register 46 in step S310. The count value being set to the input capture register 46 represents a time value when a current rising edge appears in a corresponding one of the NE signals within the range from the timing of BTDC 40 degrees CA to the timing of ATDC 40 degrees CA to execute the time stamp task.

In addition, in step S310, the CPU 35 assigns the readout count value of the free run timer 45 to a variable netime [ ], exiting the time stamp task.

Note that, as illustrated in FIG. 8A, the variable netime [ ] consists of the array of time values each representing a corresponding one rising edge appears in each of the NE signals within the range from the timing of BTDC 40 degrees CA to the timing of ATDC 40 degrees CA.

The square brackets, [and], of the variable netime [ ] are used to enclose an array index.

For example, when the time stamp task is executed at the timing of BTDC 40 degrees CA, "0" is assigned to the array index enclosed by the square brackets [ ] of the variable netime [ ].

When the time stamp task is executed at the timing of BTDC 30 degrees CA, "1" is assigned to the array index enclosed by the square brackets [ ] of the variable netime [ ].

Specifically, to the array index of the variable netime [ ] enclosed by the square brackets [ ], a numeric value that is incremented from an initial value of "0" by 1 each time the time stamp task is executed is assigned.

For this reason, the numeric value assigned to the array index of the variable netime [ ] enclosed by the square brackets [ ] shows that the time value assigned to the variable netime [ ] corresponds to what crank angle of the crankshaft.

Next, the ADC deactivating task to be executed by the CPU 35 in accordance with at least one of the programs P will be described hereinafter with reference to FIG. 7. Note that, as described above, the CPU 35 services the second NE signal interrupt occurring at the timing of ATDC 50 degrees CA to execute the ADC deactivating task.

As illustrated in FIG. 7, when starting the ADC deactivating task, the CPU 35 deactivates the A/D converter 39, the first and second digital filters 50 and 51, and at least one of the first and second DMAs 60 and 61 being currently activated in step S410.

Next, in step S420, the CPU 35 assigns, to the count value array [N], the DMA count value of a DMA counter corresponding to a DMA channel deactivated in step S410.

Note that the character "N" of the array index of the count value array [ ] enclosed by the square brackets [ ] represents a value equivalent to the sum of 1 and the DMA count value assigned to the count value array [ ] in step S220 of the previous alternate activating task. Specifically, as illustrated in FIG. 8B, the character "N" of the array index of the count value array [ ] enclosed by the square brackets [ ] is identical to the definite DMA switching count value.

The operation in step S420 allows the number of the last data string to be stored in the count value array [N]; this last data string has been transferred by the finally activated DMA channel to the working memory 41.

After completion of the operation in step S420, the CPU 35 exits the ADC deactivating task.

Next, the overlapped-sample deleting task to be executed by the CPU 35 in accordance with at least one of the programs P will be described hereinafter with reference to FIG. 9A.

In addition, FIG. 9B schematically illustrates a partially overlapped-sample determining subroutine called by the CPU 35 during the overlapped-sample deleting task. Note that the CPU 35 is programmed to execute the overlapped-sample deleting task as its base task.

The ADC activating task, the alternate activating task, and the ADC inactivating task respectively illustrated in FIGS. 4, 5, and 7 allow the number of data strings to be successively stored sample-by-sample in the CPS data storage area AR from its starting address.

Figure 8C:
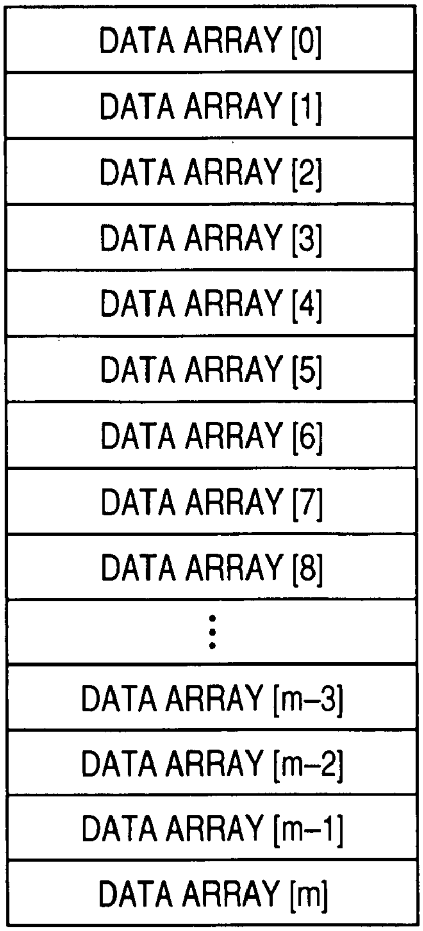
FIG. 8C is a view schematically illustrating an example of the structure of data arrays of pieces of CPS data according to the embodiment.

Let us show each of digital samples stored in the CPS data storage area AR1 of the working memory 41 is represented as a variable of data array [ ] illustrated in FIG. 8C. A numerical value enclosed by the square brackets [ ] of the data array [ ] is a pointer that indicates the position and storage location of a corresponding piece of the CPS data in the sequence of all pieces of the CPS data when a piece of the CPS data being stored in the start address is positioned at the 0th.

When the ADC inactivating task is executed at the timing of ATDC 50 degrees CA, the total number of (m+1) data arrays consisting of the data array [0] to the data array [m] is stored in the CPS data storage area AR1 of the working memory 41 from its start address.

Note that the character "m" is equivalent to the sum of the count value array [N] and the product of 255 and N, and the N represents the definite DMA switching count value obtained in step S240.

In the embodiment, for example, the CPS data storage area AR1 is allocated in the working memory 41 such that a number of data strings each consisting of 255 pieces of the CPS data can be stored in the CPS data storage area AR1. The number of data strings is equivalent to the sum of 1 and the definite DMA switching count value (N).

The respective addresses of the remaining region in the CPS data storage area AR1 of the working memory 41 after the data array [m] has stored therein no pieces of the CPS data and but therein initial values.

As illustrated in FIG. 9A, when starting the overlapped-sample deleting task, the CPU 35 assigns the value of the "m" equivalent to the sum of the count value array [N] and the product of 255 and N to a variable i, and a maximum number of data arrays to a variable j in step S510.

Note that, in step S570 of the overlapped-sample deleting task described hereinafter, the N is decremented, but in step S510, the N is equivalent to the definite DMA switching count value counted in step S240.

In addition, note that the maximum number of data arrays to be assigned to the variable j corresponds to a pointer that indicates the position and storage location of the end address of the CPS data storage area AR1, which is given by "255×(N+1)−1".

In step S520, the CPU 35 determines whether information indicative ON is set to an end flag. Note that the end flag is for example set by software in the CPU 35 each time the overlapped-sample deleting task is started. The information indicative of OFF is set as default information of the end flag.

As described hereinafter, information indicative of ON is set to the end flag when the operation in step S580 is executed.

When it is determined that information indicative of OFF is set to the end flag (the determination in step S520 is NO), the CPU 35 proceeds to step S530.

In step S530, the CPU 35 copies the value of the data array [i] to that of the data array [j], and decrements each of the variables i and j by 1.

Subsequently, in step S540, the CPU 35 determines whether the equation "i<255<N" is established.

When it is determined that the equation "i<255<N" is not established (the determination in step S540 is NO), the CPU 35 returns to step S520 and repeatedly executes the operations in step S520 and S530.

Otherwise, when it is determined the equation "i<255<N" is established (the determination in step S540 is YES), the CPU 35 proceeds to step S550.

In step S550, the CPU 35 determines whether the N is greater than zero (0).

When it is determined that the N is greater than zero (the determination in step S550 is affirmative), the CPU 35 proceeds to step S560. In step S560, the CPU 35 calls the partially overlapped-sample determining subroutine to execute it. After completion of execution of the partially overlapped-sample determining subroutine, the CPU 35 proceeds to step S570 to decrement the N by 1, returning to step S520 and repeatedly executing the operations in steps S520 to S570.

Note that, as described hereinafter, the partially overlapped-sample determining subroutine causes the CPU 35 to send, as a return value, a value of the variable i back to the main routine (the overlapped-sample deleting task). For this reason, when execution of the CPU 35 is returned to step S520 after completion of the partially overlapped-sample determining subroutine and that of the operation in step S570, the value of the variable i is set to the return value.

Otherwise, when it is determined that the N is not greater than zero (the determination in step S550 is negative), the CPU 35 proceeds to step S580. In step S580, the CPU 35 assigns information indicative of ON to the end flag, returning to step S520. In step S520, the CPU 35 determines that the information indicative of ON is set to the end flag (the determination in step S520 is YES), exiting the overlapped-sample deleting task.

Next, when starting the partially overlapped-sample determining subroutine called in step S560, the CPU 35 assigns the sum of the count value array [N−1] and 255×(N−1) to each of variables k and o in step S610.

The sum of the count value array [N−1] and 255×(N−1) assigned to each of the variables k and o in step S610 represents the pointer (the numerical value enclosed by the square brackets [ ]) of the data array [ ] expected as a leading sample of the overlapped samples of the Nth data string with respect to the (N+1)-th data string.

In step S620, the CPU 35 assigns the "255×N" to a variable l. Specifically, the pointer (the numerical value enclosed by the square brackets [ ]) of the data array [ ] indicative of the lead of the (N+1)-th data string is assigned to the variable l.

In step S630, the CPU 35 determines whether the following equation k=255×N is established. When determining it is not established (the determination in step S630 is NO), the CPU 35 proceeds to step S640.

In step S640, the CPU 35 determines whether the data array [k] is matched with the data array [l]. When it is determined that the data array [k] is matched with the data array [l] (the determination in step S640 is YES), the CPU 35 proceeds to step S650, and increments each of the variables k and l by 1, returning to step S630.

Otherwise, when it is determined that the data array [k] is matched with the data array [l] (the determination in step S640 is NO), the CPU 35 proceeds to step S660.

In step S660, the CPU 35 assigns the "255×N" to the variable l again, increments the value of the variable o by 1, and assigns the incremented value of the variable o to the variable k, returning to step S630.

Otherwise, when determining the following equation k=255×N is established (the determination in step S630 is YES), the CPU 35 proceeds to step S670.

In step S670, the CPU 35 determines whether the value of the variable l is matched with that of the variable o. When it is determined that the value of the variable l is mismatched with that of the variable o, the CPU 35 determines the value indicative of the subtraction of 1 from the value of the variable o as the return value of the variable i Then, the CPU 35 exits the partially overlapped-sample determining subroutine, returning the main routine.

Otherwise, when it is determined that the value of the variable l is matched with that of the variable o, (the determination in step S670 is YES), the CPU 35 determines that no overlapped samples of the Nth data string with respect to the (N+1)-th data string. In other words, the CPU 35 determines that dropouts occur in the Nth data string.

Thus, when the determination in step S670 is affirmative, the CPU 35 proceeds to step S680 and assigns information indicative of ON to an abnormal flag, exiting the partially overlapped-sample determining subroutine and returning the main routine. Note that the abnormal flag is for example set by software in the CPU 35 each time the partially overlapped-sample determining subroutine is called. The information indicative of OFF is set as default information of the abnormal flag.

The information indicative of ON being assigned to the abnormal flag allows the overlapped-sample deleting task to be interrupted and pieces of data stored in the CPU data storage area AR1 of the working memory 41 to be abandoned.

The operations of the CPU 35 during execution of the overlapped-sample deleting task illustrated in FIG. 9A including the partially overlapped-sample determining subroutine illustrated in FIG. 9B will be described with specific examples illustrated in FIGS. 10 and 11.

In the specific example illustrated in FIG. 10, for the sake of simplification, the DMA-channel switching is executed at two times (the definite DMA switching count value is set to 2), and the first data string to third data string are stored in the CPS data storage area AR1 of the working memory 41 from its start address.

In addition, the operations in step S220 in FIG. 5 allow 251 to be assigned to the count value array [0] associated with the first data string and 252 to be assigned to the count value array [1]. The operations in step S420 allow 136 to be assigned to the count value array [2].

In the specific example illustrated in FIG. 10, when the overlapped-sample deleting task is started, because the definite DMA switching count value is set to 2, the sum of the count value array [2] and the product of 255 and 2, which is equal to "646" is assigned to the variable i (see step S510).

Specifically, the value assigned to the variable i in step S510 represents the pointer of the data array [ ] finally stored in the CPS data storage area AR1. In addition, in step S510, "746" greater than the value "646" of the variable i, which is equal to "255×3−1", is assigned to the variable j. For this reason, at the timing of the operation in step S510, no pieces of effective data are stored in the CPS data storage area AR1 corresponding to the data array [647] to the data array [764].

At the timing of the operation in step S520, because the information indicative of OFF is assigned to the end flag (NO in step S520), the value of the variable i is copied to that of the variable j, and each of the variables i and j is decremented by 1 (see step S530). While the value of the variable i is equal to or greater than "510 equal to 255×2" (NO in step S540), the operations in step S530 are repeated.

As illustrated in the first and second stages from the bottom of FIG. 10, the repeated operations in step S530 enable the values of the arrays [646], [645], [644], . . . , which have been successively stored in the CPS data storage area AR1, to be respectively copied to the data arrays [764], [763], [762], . . . , from the address of the data array [764] in descending order.

When the value of the variable i is decremented to become "509" in step S530 so that the value of the variable j is decremented to become "627", the determination in step S540 is affirmative. At that time, 137 data arrays [646] to [510] have been successively copied to the corresponding data arrays [764] to [628], respectively (see FIG. 10). At the completion of the copy, because the N is greater than zero, the determination in step S550 is affirmative, so that the partially overlapped-sample determining subroutine is executed in step S560.

In the partially overlapped-sample determining subroutine, the sum of the count value array [N−1=1] and 255×(N−1=1), which is equal to "252+255×1" equal to "507", is assigned to each of the variables k and o in step S610. As illustrated in FIG. 10, the value "507" shows the pointer of the data array [ ] expected as a leading sample of the overlapped samples of the second data string with respect to the third data string.

In addition, the data of the data array [507] corresponds to data indicated by the count value array [1] in the second data string.

In step S620, "510 equal to "252×2" is assigned to the variable l. As described in FIG. 10, the value "510" shows the pointer of the data array [ ] corresponding to a leading sample of the third data string. In other words, the value of the data array [510] represents the leading sample of the third data string.

The operations in steps S630 to S660 check whether the values of the data arrays [507] to [509] are respectively matched with the values of the data arrays [510] to [512].

For example, FIG. 10 illustrates a case where the values of the data arrays [507] to [509] are respectively matched with the values of the data arrays [510] to [512].

Specifically, because the variable k is equal to 507, the determination in step S630 is negative, so it is checked whether the value of the data array [507] is matched with that of the data array [510] corresponding to the leading sample of the third data string in step S640.

When the value of the data array [507] is matched with that of the data array [510] (the determination in step S640 is YES), each of the variables k and l is incremented by 1 in step S650, and thereafter execution of the CPU 35 is returned to step S630.

In step S630, because the variable k is equal to 508 remaining lower than 510, the determination therein is negative, so it is checked whether the value of the data array [508] is matched with that of the data array [511] corresponding to the second sample of the third data string in step S640.

When the value of the data array [508] is matched with that of the data array [511] (the determination in step S640 is YES), each of the variables k and l is incremented by 1 in step S650, and thereafter execution of the CPU 35 is returned to step S630.

In step S630, because the variable k is equal to 509 remaining lower than 510, the determination therein is negative, so it is checked whether the value of the data array [509] is matched with that of the data array [512] corresponding to the third sample of the third data string in step S640.

When the value of the data array [509] is matched with that of the data array [512] (the determination in step S640 is YES), each of the variables k and l is incremented by 1 in step S650, and thereafter execution of the CPU 35 is returned to step S630.

In step S630, because the variable k is equal to 510, the determination therein is affirmative, so execution of the CPU 35 is shifted to step S670.

At the timing of shifting to step S670, because the variable l is equal to 513 and the variable o is equal to 507, the determination in step S670 is negative. As a result, "506" defined by the subtraction of 1 from the value (=507) of the variable o is returned to the overlapped-sample deleting task as the return value of the variable i, and the partially overlapped-sample determining subroutine is terminated.

Thereafter, when execution of the CPU 35 is shifted from step S560 to step S570, the N is decremented by 1 to become 1 (=2−1 equal to 1). When the operations in steps S520 to S570 are executed again, "506" and "627" are respectively assigned to the variables i and j.

Specifically, as illustrated in the first and second stages from the bottom of FIG. 10, the repeated operations in steps S530 and S540 enable the values of the data arrays [506] to [255] of the second data string except for the overlapped samples [507] to [509] thereof to be respectively copied to the corresponding data arrays [627] to [376].

In other words, the overlapped samples of the data arrays [507] to [509] are deleted from the CPS data storage area AR1.

When the value of the variable i is decremented to become "254" in step S530 so that the value of the variable j is decremented to become "375", the determination in step S540 is affirmative. At that time, because the N remains to be greater than zero, the determination in step S550 is affirmative, so that the partially overlapped-sample determining subroutine is executed in step S560.

In the second partially overlapped-sample determining subroutine, the sum of the count value array [N−1=0] and 255×(N−1=0), which is equal to "251+255×0" equal to "251", is assigned to each of the variables k and o in step S610. As illustrated in FIG. 10, the value "251" shows the pointer of the data array [ ] expected as a leading sample of the overlapped samples of the first data string with respect to the second data string.

In addition, the data of the data array [251] corresponds to data indicated by the count value array [0] in the first data string.

In step S620, "255 equal to "251×1" is assigned to the variable l. As described in FIG. 10, the value "255" shows the pointer of the data array [ ] corresponding to a leading sample of the second data string. In other words, the value of the data array [255] represents the leading sample of the second data string.

The operations in steps S630 to S660 check whether the values of the data arrays [251] to [254] are respectively matched with the values of the data arrays [255] to [258].

For example, FIG. 10 illustrates a case where the values of the data arrays [251] to [254] are respectively matched with the values of the data arrays [255] to [258].

Specifically, because the variable k is equal to 251, the determination in step S630 is negative, so it is checked whether the value of the data array [251] is matched with that of the data array [255] corresponding to the leading sample of the second data string in step S640.

When the value of the data array [251] is matched with that of the data array [255] (the determination in step S640 is YES), each of the variables k and l is incremented by 1 in step S650, and thereafter execution of the CPU 35 is returned to step S630.

Thereafter, the operations of steps S630 to S650 are repeated until the determination in step S630 is affirmative, and therefore, it can be checked that the values of the data arrays [251] to [254] are respectively matched with those of the data arrays [255] to [258].

Thereafter, in step S630, because the variable k is equal to 255, the determination therein is affirmative, so execution of the CPU 35 is shifted to step S670.

At the timing of shifting to step S670, because the variable l is equal to 259 and the variable o is equal to 251, the determination in step S670 is negative. As a result, "250" defined by the subtraction of 1 from the value (=256) of the variable o is returned to the overlapped-sample deleting task as the return value of the variable i, and the partially overlapped-sample determining subroutine is terminated.

Thereafter, when execution of the CPU 35 is shifted from step S560 to step S570, the N is decremented by 1 to become 0 (=1−1 equal 0). When the operations in steps S520 to S570 are executed again, "250" and "375" are respectively assigned to the variables i and j.

Specifically, as illustrated in the first and second stages from the bottom of FIG. 10, the repeated operations in steps S530 and S540 enable the values of the data arrays [250] to [0] of the first data string except for the overlapped samples [251] to [254] thereof to be respectively copied to the corresponding data arrays [375] to [125].

In other words, the overlapped samples of the data arrays [251] to [254] are deleted from the CPS data storage area AR1.

Thereafter, because the value of the variable i is decremented to become "−1" in step S530, the determination in step S540 is affirmative. At that time, because the N is equal to zero, the determination in step S550 is negative; This allows the information indicative of ON to be assigned to the end flag, so the overlapped-sample deleting task is terminated.

In addition, as described above, the value of the data array [507] is expected as a leading sample of the overlapped samples of the second data string with respect to the third data string and is indicated by the count value array [1] in the second data string.

Figure 11:
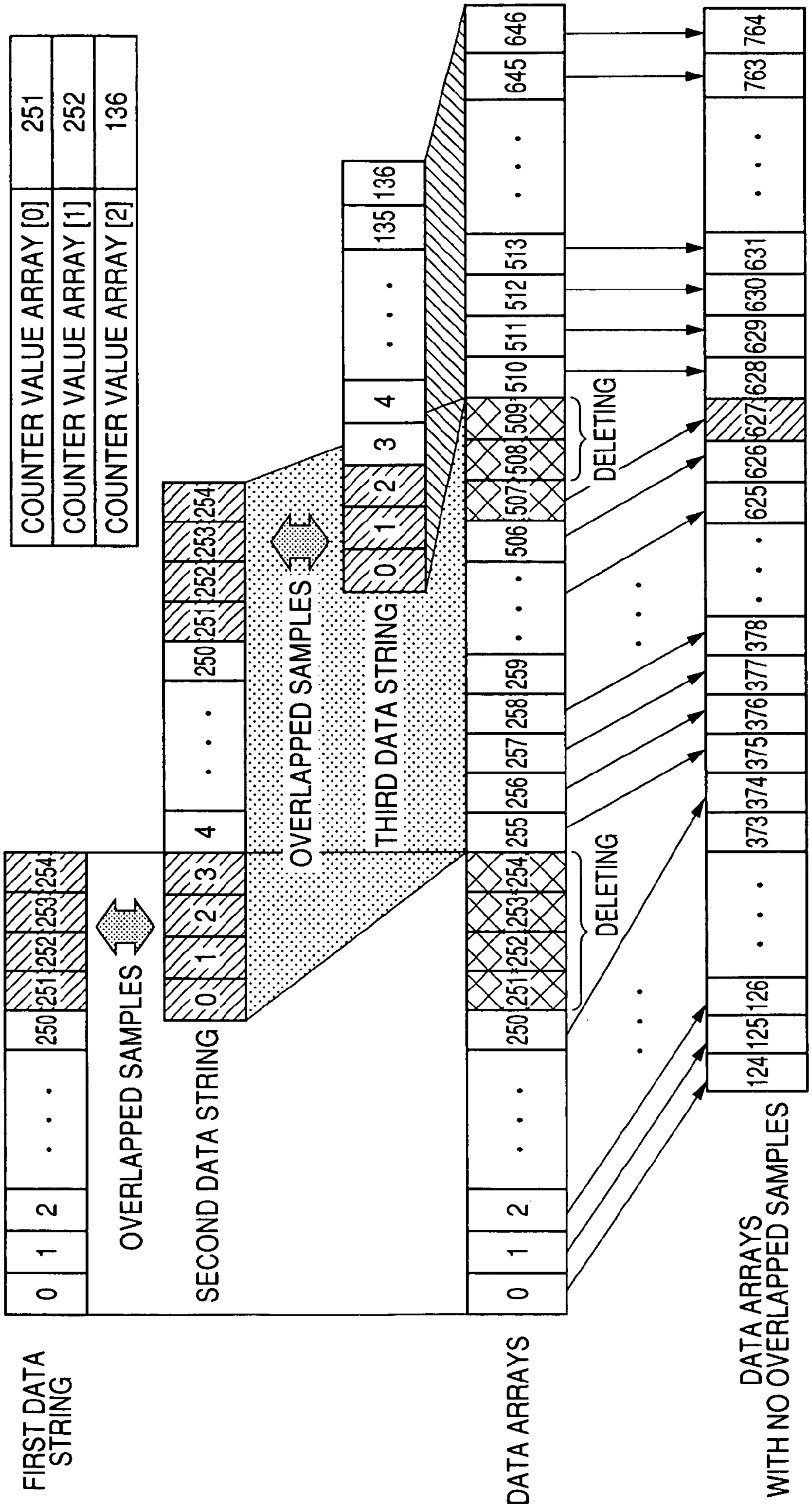
FIG. 11 is a view schematically illustrating another example of relationships between each of first to third data strings to be transferred by the first and second DMA channels and data arrays with overlapped samples stored in a working memory of the microcomputer, and between the data arrays with overlapped samples and data arrays with no overlapped samples according to the embodiment.

As illustrated in, for example, FIG. 11, the value of the data array [507] of the second data string is mismatched with that of the data array [510] corresponding to the leading sample of the third data string.

Whereas, the values of the data arrays [508] and [509] following the array [507] are respectively matched with those of the data arrays [510] and [511].

This case may occur because there is a delay time from the activation of the first DMA channel A0 to that of the second DMA channel A1. The delay time may cause the value of the data array [510] corresponding to the leading sample of the third data string, which corresponds to the value of the data array [507] of the second data string, not to be transferred to the working memory 41. This may provide the case.

In the embodiment, in order to address this case, the values of the data arrays [507] to [255] of the second data string except for the overlapped samples [508] and [509] thereof are respectively copied to the corresponding data arrays [627] to [375].

Specifically, when the partially overlapped-sample determining subroutine is executed with the N being equal to 2, in step S640, the value of the data array [507] is mismatched with that of the data array [510] (the determination in step S640 is NO). The negative determination allows 510 equal to "255×2" to be assigned to the variable l and the variable o to be incremented by 1 in step S660, causing the values of the variables o and k to become 508. Thereafter, execution of the CPU 35 is returned to step S630.

In step S630, because the variable k is equal to 508, the determination in step S630 is negative, so it is checked whether the value of the data array [508] is matched with that of the data array [510] corresponding to the leading sample of the third data string in step S640.

When the value of the data array [508] is matched with that of the data array [510] (the determination in step S640 is YES), each of the variables k and l is incremented by 1 in step S650, and thereafter execution of the CPU 35 is returned to step S630.

In step S630, because the variable k is equal to 509 remaining lower than 510, the determination therein is negative, so it is checked whether the value of the data array [509] is matched with that of the data array [511] corresponding to the second sample of the third data string in step S640.

When the value of the data array [509] is matched with that of the data array [511] (the determination in step S640 is YES), each of the variables k and l is incremented by 1 in step S650, and thereafter execution of the CPU 35 is returned to step S630.

In step S630, because the variable k is equal to 510, the determination therein is affirmative, so execution of the CPU 35 is shifted to step S670.

At the timing of shifting to step S670, because the variable l is equal 512 and the variable o is equal 508, the determination in step S670 is negative. As a result, "507" defined by the subtraction of 1 from the value (=508) of the variable o is returned to the overlapped-sample deleting task as the return value of the variable i, and the partially overlapped-sample determining subroutine is terminated.

Thereafter, when execution of the CPU 35 is shifted from step S560 to step S570, the N is decremented by 1 to become 1 (=2−1 equal to 1). When the operations in steps S520 to S570 are executed again, "506" and "627" are respectively assigned to the variables i and j.

Specifically, as illustrated in the first and second stages from the bottom of FIG. 11, the repeated operations in steps S530 and S540 enable the values of the data arrays [507] to [255] of the second data string except for the overlapped samples [508] and [509] thereof to be respectively copied to the corresponding data arrays [627] to [375].

In the case illustrated in FIG. 11, the data of the data array [507] is kept undeleted so that the number of digital samples of the second data string from which the overlapped samples have been deleted more increases by 1 as compared with the corresponding number of digital samples of the second data string illustrated in FIG. 10.

For this reason, the values (digital samples) of the data arrays [507] to [255] of the second data string except for the overlapped samples [508] and [509] thereof are respectively copied to the corresponding data arrays [627] to [375].

For this reason, like the case illustrated in FIG. 10, the values of the data arrays [250] to [0] of the first data string except for the overlapped samples [251] to [254] thereof to be respectively copied to the corresponding data arrays [374] to [124].

Specifically, it is assumed that the definite DMA switching count value is set to N, and each of the first to N-th data strings will be referred to as the nth data string ($1 \leqq n \leqq N$).

In this assumption, in the subroutine illustrated in FIG. 9B, digital samples in the nth data string, which are located on or after a digital sample, for example "507" in FIG. 11, pointed out by the count value array [n−1] associated with the nth data string are compared with a leading sample and corresponding digital samples following it in the (n+1)-th data string.

When successive digital samples in the digital samples, which are located on or after the digital sample pointed out by the count value array [n−1], for example, "508 and 509" in FIG. 11, in the nth data string are matched with those in the (n+1)-th data string located on or after its leasing sample, for example, "510" in FIG. 11, the successive digital samples in the nth data string are found out as the overlapped redundant samples therein.

Then, the pointer of a digital sample, such as "507" in FIG. 11, before the overlapped redundant samples in the nth data string is returned to the overlapped-sample deleting task as the return value of the variable i.

Thereafter, in the overlapped-sample deleting task illustrated in FIG. 9A, in the (N+1)-th (last) data string, all digital samples therein are successively copied to the CPS data storage region AR1 from its end address in descending order.

However, in each of the first to Nth data strings, successive digital samples located after a digital sample pointed out by the return value of the variable i are deleted. Thereafter, the remaining digital samples from the digital sample pointed out by the return value of the variable i and the leading sample therein are successively copied to the CPS data storage region AR1 from its address adjacent to the finally copied sample of the (N+1)-th data string in descending order.

Specifically, the overlapped-sample deleting task including the partially overlapped-sample determining subroutine enables overlapped redundant samples to be deleted from the first to the (N+1)-th data strings, which have been successively stored in the CPS data storage area AR1 of the working memory 41. After deletion, the overlapped-sample deleting task including the partially overlapped-sample determining subroutine enables the first to the (N+1)-th data strings except for the overlapped redundant samples to be restored in the CPS data storage area AR1 of the working memory 41.

Moreover, in the case illustrated in FIG. 10, it is assumed that the values of the data arrays [507] to [509] of the second data string are respectively mismatched with those of the data arrays [510] to [511] of the third data string.

In this assumption, when the partially overlapped-sample determining subroutine is executed with the N being equal to 2, the determination in step S640 is negative at all times. This allows the determination in step S670 to be affirmative so that the information indicative of ON is assigned to the abnormal flag.

Specifically, it is assumed that the definite DMA switching count value is set to N, and each of the first to N-th data strings will be referred to as the nth data string ($1 \leqq n \leqq N$).

In this assumption, in the subroutine, when no digital samples in the nth data string, which are located on or after a digital sample pointed out by the count value array [n−1] associated with the nth data string, are matched with a leading sample and corresponding digital samples following it in the (n+1)-th data string, it is determined that dropouts may occur in the nth data string for any reason. Then, the abnormal flag is turned ON so that digital samples stored in the CPS data storage area AR1 of the working memory 41 can be prevented from being used for control of the diesel engine 10.

Next, the angle-synchronized data rearranging task to be executed by the CPU 35 in accordance with at least one of the programs P will be described hereinafter with reference to FIG. 12A. Note that angle-synchronized data rearranging task is executed after the overlapped-sample deleting task is completed.

Figure 12B:
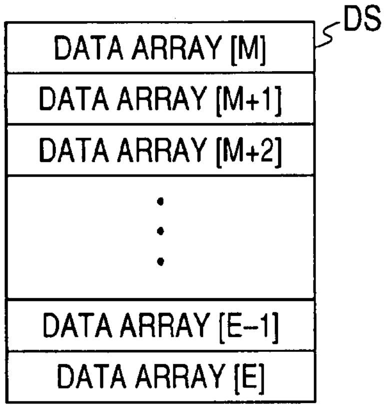
FIG. 12B is a view schematically illustrating an example of the structure of a data string with no overlapped samples according to the embodiment.

As illustrated in FIG. 12B, in the CPS data storage area AR1 of the working memory 41, a data string DS with no overlapped samples, which consists of a data array [M] to a data array [E], is stored. Note that the M enclosed by the square brackets [ ] of the data array [ ] is a pointer of the leading data of the data string with no overlapped samples. For example, in the case illustrated in FIG. 11, the pointer of the leading data of the data string DS with no overlapped samples corresponds to "124".

Similarly, note that the E enclosed by the square brackets [ ] of the data array [ ] is a pointer of the last data of the data string DS with no overlapped samples. For example, in the case illustrated in FIG. 11, the pointer of the last data of the data string DS with no overlapped samples corresponds to "764".

The angle-synchronized data rearranging task is designed to have obtained, based on the data string DS with no overlapped samples, pieces of CPS data at the crank angle of 1 degree for the duration of the rotation of the crankshaft by 80 degrees CA from the timing of BTDC 40 degrees CA to the timing of ATDC 40 degrees CA.

Figure 12C:
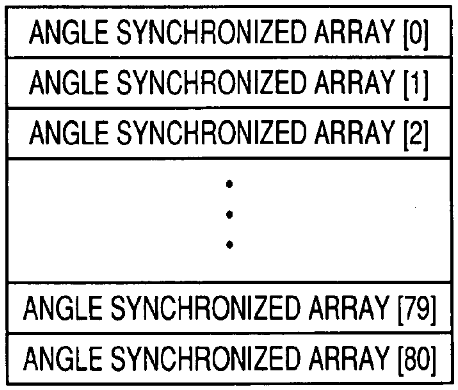
FIG. 12C is a view schematically illustrating an example of the structure of a string of pieces of CPS data every 1 degree CA according to the embodiment.

The angle-synchronized data rearranging task is also designed to successively store the obtained pieces of CPS data every 1 degree CA in the storage area AR2 of the working memory 43 as an angle synchronized array [0], an angle synchronized array [1], an angle synchronized array [2], thus generating a string of pieces of CPS data every 1 degree CA (see FIG. 12C).

As illustrated in FIG. 12A, when starting the angle-synchronized data rearranging task, the CPU 35 assigns an initial value of 0 to each of a variable k1 and a variable i1 in steps S710 and S720. In the angle-synchronized data rearranging task, the variable k1 represents a pointer (the numerical value enclosed by the square brackets [ ]) of each of the angle synchronized arrays [ ].

The variable i1 represents a pointer (the numerical value enclosed by the square brackets [ ]) of the variable netime [ ]. The variable netime [ ] consists of the array of time values each representing a corresponding one rising edge appears in each of the NE signals within the range from the timing of BTDC 40 degrees CA to the timing of ATDC 40 degrees CA (see FIG. 8A). The pointer i1 assigned to the array index of the variable netime [ ] enclosed by the square brackets [ ] shows that the time value assigned to the variable netime [ ] corresponds to what crank angle of the crankshaft. The variable netime [ ] will be referred to as "NE interrupt time array [ ]" hereinafter.

In step S730, the CPU 35 assigns, to a variable datapos, the value obtained by dividing the subtraction of adtime from the NE interrupt time array netime [i1] by the sampling interval of the A/D converter 39. The variable datapos is used to serve as a pointer of a data array. The NE interrupt time array netime [i1] representing the time values at 10 degrees CA, and the adtime represents the activating time of the A/D converter 39.

Specifically, division of the subtraction of the adtime from the NE interrupt time array netime [i1] by the NE interrupt time array netime [i1] allows identification of what number of a data array corresponding to the NE interrupt time array netime [i1] in the data string DS from the leading data array [M]. In order to avoid any dropouts, the value of the variable datapos has a decimal fraction.

In step S740, the CPU 35 assigns, to a variable 1catime, the value obtained by dividing the subtraction of the netimte [i1] from the netime [i1+1] by 10. Specifically, division of the NE interrupt interval corresponding to the time interval from the netime [i1+1] to the netime [i1] by 10 allows a time value at each one degree CA to be obtained. The CPU 35 assigns the obtained value to the variable 1catime.

In step S750, the CPU 35 assigns, to a variable ratiopos, the value obtained by dividing the variable 1catime by the sampling interval of the A/D converter 39. The value obtained by dividing the variable 1catime by the sampling interval of the A/D converter 39 represents the number of pieces of CPS data obtained for the duration of the rotation of the crankshaft at 1 degree CA. In order to avoid any dropouts, the value of the variable ratiopos has a decimal fraction.

In step S760, the CPU 35 assigns an initial value of 0 to a variable j1.

Next, in step S770, the CPU 35 copies the data array [M+int (datapos)] to the angle synchronized arrays [k1]. Note that the variable int (datapos) represents the integer based on the value of the variable datapos. For example, in the embodiment, the variable int (datapos) represents the integer obtained by rounding off or down the value of the variable datapos.

In step S780, the CPU 35 assigns the sum of the value of the variable datapos and that of the variable ratiopos to the variable datapos again, and in step S790, increments each of the variables j1 and k1 by 1.

Next, in step S800, the CPU 35 determines whether the value of the variable j1 is less than 10.

When it is determined that the value of the variable j1 is less than 10 (the determination in step S800 is YES), the CPU 35 returns to step S770 and executes the operations in steps S770 to S800.

Otherwise, when it is determined that the value of the variable j1 is equal to or greater than 10 (the determination in step S800 is NO), the CPU 35 proceeds to step S810 and increments the variable i1 by 1. Next, in step S820, the CPU 35 determines whether the value of the variable i1 is less than 8.

When it is determined that the value of the variable i1 is less than 8 (the determination in step S820 is YES), the CPU 35 returns to step S730 and executes the operations in steps S730 to S820.

Otherwise, when it is determined that the value of the variable i1 is equal to or greater than 8 (the determination in step S820 is NO), the CPU 35 proceeds to step S830.

In step S830, like step S730, the CPU 35 assigns, to the variable datapos, the value obtained by dividing the subtraction of the adtime from the NE interrupt time array netime [i1] by the sampling interval of the A/D converter 39.

Subsequently, in step S840, like step S770, the CPU 35 copies the data array [M+int (datapos)] to the angle synchronized arrays [k2], and thereafter, exits the angle-synchronized data rearranging task.

The operations of the CPU 35 during execution of the angle-synchronized data rearranging task illustrated in FIG. 12A will be described with a specific example illustrated in FIG. 13.

Figure 13:
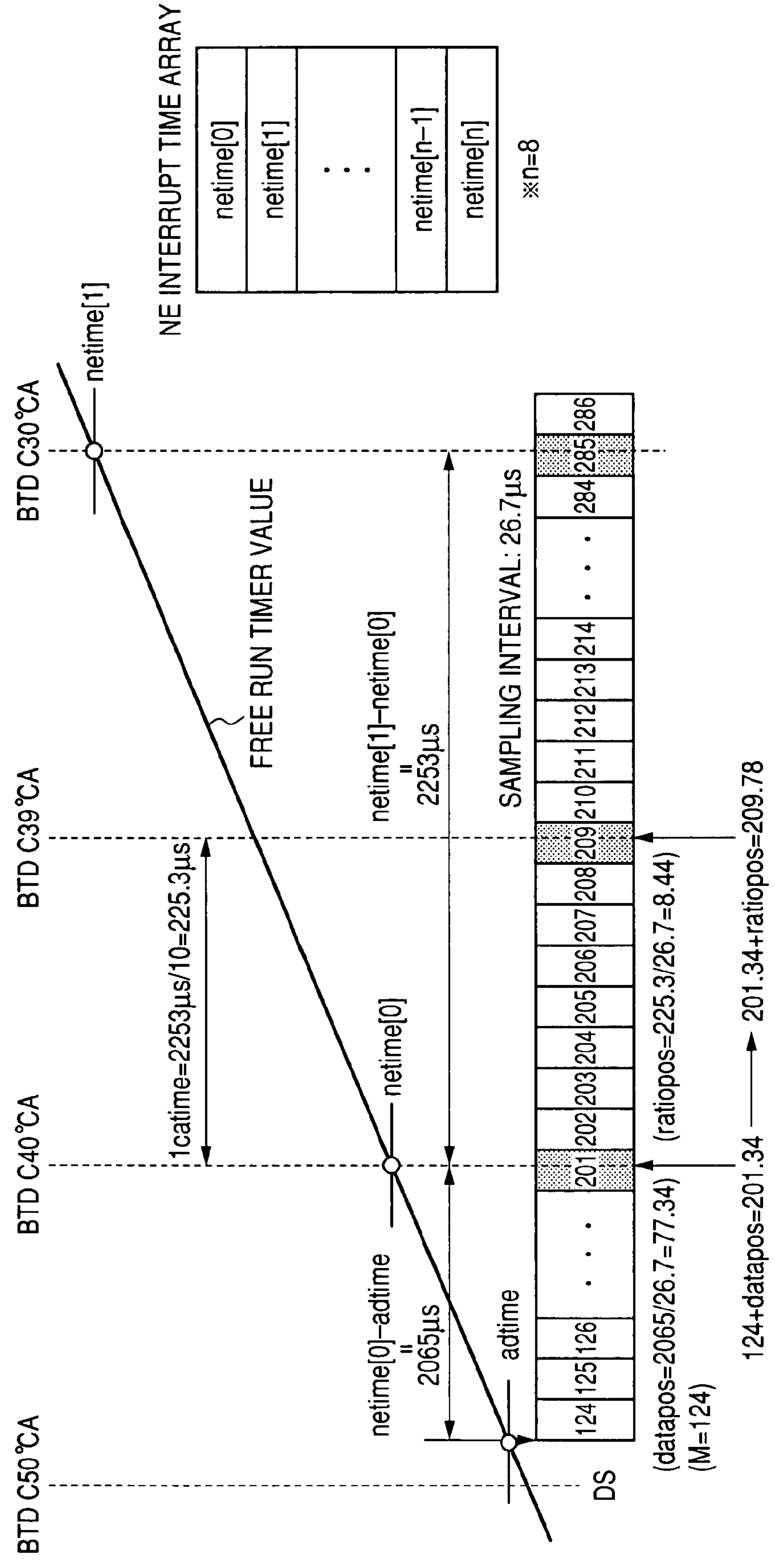
FIG. 13 is a timing chart schematically illustrating a relationship between timings of crank angles of a crankshaft of the diesel engine and pieces of the data string illustrated in FIG. 12A.

In the specific example illustrated in FIG. 13, the M is set to 124, the sampling interval is set to 26.7 microseconds, the value of the adtime from the NE interrupt time array netime [0] is set to 2065 microseconds, and the value of the adtime from the NE interrupt time array netime [1] is set to 2253 microseconds.

In the firstly executed step S730 after the angle-synchronized data rearranging task is started, division of the subtraction of the adtime from the NE interrupt time array netime [0] by the sampling interval of the A/D converter 39 allows the variable datapos of 77.34 to be calculated.

In the firstly executed steps S740 and S750, division of the NE interrupt interval corresponding to the time interval from the netime [1] to the netime [0] by 10 allows the variable 1catime of 225.3 microseconds to be calculated. Division of the variable 1catime of 225.3 by the sampling interval of 26.7 microseconds allows the variable ratiopos of 8.44 to be calculated.

In the firstly executed step S770, the data array at the timing of BTDC 40 degrees CA is identified to the data array [124+int (77.34)] equal to the data array [201]. Thus, the value of the data array [201] is copied to the angle synchronized array [k1=0].

Next, operations in step S780 and S790 allow:

the value of the variable datapos to be increased by the value of the variable ratiopos representing the number of pieces of CPS data obtained for the duration of the rotation of the crankshaft at 1 degree CA; and each of the variables j1 and k1 to be incremented by 1.

Thereafter, the operation in step S770 is executed second.

In the second executed step S770, the data array at the timing (BTDC 39 degrees CA) leading 1 degree CA from the BTDC 40 degrees CA is identified to the data array [124+int (77.34+8.44=85.78)] equal to the data array [209]. Thus, the value of the data array [809] is copied to the angle synchronized array [k1=1].

Next, the operations in steps S770 to S790 are repeated until the value of the variable j1 after its being incremented by 1 in step S790 reaches 10. This allows the values of the data arrays [218], [226], [268], and [277], which respectively correspond to the timings leading, from the BTDC 40 degrees CA, 2 degree CA, 3 degree CA, . . . , 8 degree CA, and 9 degree CA, to be copied to the angle synchronized arrays [2], [3], . . . , [8], and [9], respectively.

Specifically, while the variable i1 is set to 0, the operations in steps S770 to S790 are repeatedly executed at ten times so that the values of the data arrays from the BTDC 40 degrees CA to the BTDC 31 degrees CA obtained at 1 degree CA intervals can be copied to the angle synchronized arrays [0] to [9], respectively.

Thereafter, when the value of the variable j1 after its being incremented by 1 in step S790 reaches 10 (the determination in step S800 is NO), the variable i1 is incremented by 1 (see step S810), and thereafter, the operations in steps S730 to S820 are repeatedly executed.

In the second executed step S730, division of the subtraction of the adtime from the NE interrupt time array netime [1] at the BTDC 30 degrees CA by the sampling interval of the A/D converter 39 allows the value of the variable datapos to be calculated.

In the second executed steps S740 and S750, division of the NE interrupt interval corresponding to the time interval from the netime [2] to the netime [1] by 10 allows the value of the variable 1catime to be calculated. Division of the value of the variable 1catime by the sampling interval allows the variable ratiopos of 8.44 to be calculated.

Subsequently, while the variable i1 is set to 1, the operations in steps S770 to S790 are repeatedly executed at ten times so that the values of the data arrays from the BTDC 30 degrees CA to the BTDC 21 degrees CA obtained at 1 degree CA intervals can be copied to the angle synchronized arrays [10] to [19], respectively.

Thereafter, the operations in steps S730 to step S810 are repeatedly executed until the value of the variable i1 after its being incremented by 1 in step S820 reaches 8.

Specifically, the operations in steps S730 to S810 are repeatedly executed at ten times so that the values of the data arrays from the BTDC 40 degrees CA to the ATDC 39 degrees CA sampled at 1 degree CA intervals can be copied to the angle synchronized arrays [0] to [79], respectively.

When the value of the variable i1 reaches 8, the operations in steps S830 and S840 are executed. This allows the value of the data array at the timing of ATDC 40 degrees CA to be copied to the angle synchronized array [80].

At the completion of the operation in step S840, the data string consisting of the data arrays [0] to [80] at every 1 degree CA can be stored in the working memory 43, and therefore, the angle-synchronized data rearranging task is exited.

Note that, in order to more increase the accuracy of the pieces of CPS data sampled at 1 degree CA intervals, the technical features that have been described in s U.S. Pat. No. 7,079,930 can be all incorporated herein by reference.

In the U.S. Pat. No. 7,079,930, the digital samples of the CPS data stored in the CPS data storage area AR1 of the working memory 41 can be interpolated based on the variable 1catime, which makes it possible to obtain the pieces of CPS data sampled at 1 degree CA intervals with more high accuracy.

As described above, the microcomputer 33 installed in the ECU 1 according to the embodiment is configured to successively and alternately activate the first and second DMA channels A0 and A1 while the duration of the first DMA channel A1 and that of the second DMA channel are partially overlapped with each other.

This enables the digital samples outputted from the first and second digital filters 50 and 51 at constant sampling intervals within the data collecting period to be stored in the CPS data storage area AR1 of the working memory 41 without digital-sample dropouts.

In addition, the microcomputer 33 according to the embodiment is configured to execute the overlapped-sample deleting task including the partially-overlapped sample determining subroutine illustrated in FIGS. 9A and 9B, thus:

finding out overlapped redundant samples in the digital samples outputted from the first and second digital filters 50 and 51 at constant sampling intervals within the data collecting period; and deleting the overlapped redundant samples found out by the execution of the overlapped-sample deleting task.

The configuration of the microcomputer 33 makes it possible to, even if each of the channels A0 and A1 has an upper limit to the number of digital samples transferable thereby, store in the memory 41 the digital samples outputted from the filters 50 and 51 at constant sampling intervals within the data collecting period without the digital samples being overlapped with each other and dropping out.

In addition, the microcomputer 33 installed in the ECU 1 according to the embodiment is configured to execute the angle-synchronized data rearranging task illustrated in FIG. 12 based on the digital samples from which the overlapped redundant samples are deleted, thus precisely obtaining pieces of the CPS data sampled at 1 degree CA intervals. This makes it possible for the microcomputer 33 to precisely control the diesel engine 10 based on the obtained pieces of the CPS data sampled at 1 degree CA intervals.

In the embodiment, it is assumed that the definite DMA switching count value is set to N, and each of the first to N-th data strings will be referred to as the nth data string ($1 \leqq n \leqq N$).

In this assumption, in the subroutine illustrated in FIG. 9B, digital samples in the nth data string, which are located on or after a digital sample pointed out by the count value array [n−1] associated with the nth data string, are compared with a leading sample and corresponding digital samples following it in the (n+1)-th data string.

When successive digital samples in the digital samples, which are located on or after the digital sample pointed out by the count value array [n−1] are matched with those in the (n+1)-th data string located on or after its leasing sample, it is possible to find out the successive digital samples as the overlapped redundant samples to thereby delete them.

In addition, in the partially overlapped-sample determining subroutine, when no digital samples in the nth data string, which are located on or after a digital sample pointed out by the count value array [n−1] associated with the nth data string, are matched with a leading sample and corresponding digital samples following it in the (n+1)-th data string, it is determined that dropouts may occur in the nth data string for any reason. This causes the abnormal flag to be turned ON, the abnormal flag having the ON state preventing digital samples stored in the working memory 41 from being used for control of the diesel engine 10.

In the embodiment, in step S560 of FIG. 9A, the CPU 35 executes the partially overlapped-sample determining subroutine, but the present invention is not limited to the structure. Specifically, in step S560, the CPU 35 can assign the sum of the count value array [N−1] and {255×(N−1)−1}, and thereafter, proceeding to step S570.

With the configuration, one or more digital samples in the nth data string, which are located on or after a digital sample pointed out by the count value array [n−1] associated with the nth data string are deleted as overlapped redundant samples.

In contrast, in the embodiment, even if the delay time causes the value of the data array [510] corresponding to the leading sample of the third data string, which corresponds to the value of the data array [507] of the second data string, not to be transferred to the working memory 41, the partially overlapped-sample determining subroutine illustrated in FIG. 9B can keep the data array [507] undeleted even in the case due to the delay time illustrated in FIG. 11. This making it possible to precisely find out actual overlapped redundant samples.

As described above, the number of overlappedly transferred pairs of identical digital samples can be preferably designed to be equal to or greater than three or more samples.

For example, as illustrated in FIG. 10, three pairs of the data arrays [507] and [510], [508] and [511], and [509] and [512] are designed to be overlappedly transferred pairs of identical digital samples. Similarly, four pairs of the data arrays [251] and [255], [252] and [256], [253] and [257], and [254] and [258] are designed to be overlappedly transferred pairs of identical digital samples.

The three or more overlappedly transferred pairs of identical digital samples can reliably prevent digital-sample dropouts.

In the embodiment, the microcomputer 33 is configured to successively and alternately activate the first and second DMA channels A0 and A1.

In the present invention, three or more DMA channels can be installed in the microcomputer 33. In this modification, the microcomputer 33 can be configured to:

successively activate the three or more DMA channels in a predetermined order; and when all of the data strings have not been completely transferred yet to the working memory 41 by the successive activations, successively activate the three or more DMA channels in the predetermined order again.

Specifically, the microcomputer 33 can be configured to repeatedly and successively activate three or more DMA channels in the predetermined order so as to completely store al of the data strings in the working memory 41.

The angle-synchronized data rearranging task illustrated in FIG. 12A can be designed to store the pieces of the CPS data sampled at 1 degree CA in another storage area of the working memory 41 except for the CPS data storage area AR1 thereof.

The microcomputer 33 can be configured such that digital samples filtered out from a single digital filter is input to the first and second DMAs 60 and 61.

In the microcomputer 33, the first and second digital filters can be omitted such that digital samples converted by the A/D converter 39 are directly input to the first and second DMAs 60 and 61.

In the embodiment, the present invention is applied to microcomputers installed in an engine ECU for processing CPS signals each outputted from a corresponding one of cylinder pressure sensors. The present invention can be applied to data processors installed in an engine ECU or another ECU for processing signals successively input thereto; these plurality of signals that are required to control the vehicle, such as these signals are associated with the operating conditions of the engine.

Moreover, in the embodiment, the present invention is applied to microcomputers installed in an engine ECU for controlling an internal combustion engine, but the present invention may also be applied in other industries or applications.

Specifically, the present invention can be applied to data processors used for various target devices, such as electronic devices, actuators, and the like.

Such data processors each have at least one pair of data transferring units each of which:

works to successively transfer pieces of data to a memory; and has an upper limit number of data successively transferable when activated.

In addition, those skilled in the art will appreciate that the present invention is capable of being distributed as software programs, for example, the programs P in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A data processor for processing a plurality of pieces of input data successively sampled, the data processor comprising:

a memory unit;

a plurality of data transferring units for transferring data, each of the plurality of data transferring units having an upper limit to a number of data items successively transferable when activated; and an activating unit configured to successively activate, within a predetermined time frame, the plurality of data transferring units without all of the plurality of data transferring units being deactivated within the predetermined time frame to thereby successively transfer the plurality of pieces of input data to the memory unit so as to store the plurality of pieces of input data therein.

2. A data processor according to claim 1, wherein the activating unit is configured to successively activate, within the predetermined time frame, the plurality of data transferring units while an activation duration of each of the plurality of data transferring units is partially overlapped with an activation duration of another one of the plurality of data transferring units which is activated next to activation of each of the plurality of data transferring units.

3. A data processor for processing a plurality of pieces of engine control data successively sampled at constant intervals, the constant intervals each being determined to be associated with a rotation angle of a crankshaft of an engine, the data processor comprising:

a memory unit;

a plurality of data transferring units for transferring data, each of the plurality of data transferring units having an upper limit to a number of data items successively transferable when activated; and an activating unit configured to successively activate, within a predetermined time frame, the plurality of data transferring units without all of the plurality of data transferring units being deactivated within the predetermined time frame to thereby successively transfer the plurality of pieces of engine control data to the memory unit so as to store the plurality of pieces engine control data therein.

4. A data processor according to claim 3, wherein the activating unit is configured to successively activate, within the predetermined time frame, the plurality of data transferring units while an activation duration of each of the plurality of data transferring units is partially overlapped with that of another one of the plurality of data transferring units which is activated next to activation of each of the plurality of data transferring units.

5. A data processor according to claim 4, wherein, upon a start timing of the time frame being generated, the activating unit is configured to:

successively activate the plurality of data transferring units in a predetermined order such that:

each of the plurality of data transferring units being activated transfers the plurality of pieces of engine control data in string format, and upon each of the plurality of data transferring units being activated, another one of the plurality of data transferring units next to each of the plurality of data transferring units in the predetermined order is activated until a number of pieces of engine control data that have been transferred by each of the plurality of data transferring units since the activation thereof reaches the upper limit of each of the plurality of data transferring units so as to provide a partially overlapped activation duration between an activation duration of each of the plurality of data transferring units and that of another one of the plurality of data transferring units; and store a plurality of engine-control data strings successively transferred by the plurality of data transferring units in string format in a plurality of storage areas of the memory unit, respectively, the plurality of engine-control data strings each including several pieces of the engine control data, the sum of the respective several pieces of the plurality of engine-control data strings being equivalent to the number of the plurality of pieces of engine control data, the plurality of storage areas being different in location in the memory unit from each other.

6. A data processor according to claim 5, further comprising:

a deleting unit configured to:

search, after a lapse of the predetermined time frame, the memory unit to find out at least one piece of engine control data overlappedly transferred by each pair of successively activated data transferring units in the plurality of data transferring units, the at least one piece of engine control data transferred by one of the successively activated data transferring units of each pair being identical to that of engine control data transferred by the other of the successively activated data transferring units of each pair; and delete, as at least one overlapped redundant item, the found-out at least one piece of engine control data transferred by one of the successively activated data transferring units of each pair.

7. A data processor according to claim 6, wherein the activating unit comprises:

an identifier storing unit configured to store an identifier in the memory unit, the identifier indicating which piece of engine control data of a corresponding one of the plurality of engine-control data strings is transferred by each of the plurality of data transferring unit upon another one of the plurality of data transferring units being activated, and the deleting unit is configured to:

search, after the lapse of the predetermined time, each of the plurality of engine-control data strings stored in the memory unit to find out the piece of engine control data identified by the identifier and stored in each of the plurality of engine-control data strings; and delete, as the at least one overlapped redundant item, at least one piece of engine control data of each of the plurality of engine-control data strings, the at least one piece of engine control data being transferred to be stored in the memory unit after the piece of engine control data of each of the plurality of engine-control data strings identified by the identifier is transferred to be stored therein.

8. A data processor according to claim 6, wherein the activating unit comprises:

an identifier storing unit configured to store an identifier in the memory unit, the identifier indicating which piece of engine control data of a corresponding one of the plurality of engine-control data strings is transferred by each of the plurality of data transferring unit upon another one of the plurality of data transferring units being activated, and when one of the plurality of engine-control data strings transferred by an n-th activated one of the plurality of data transferring unit from the start timing of the time frame is referred to as an nth engine-control data string and the n is an integer equal to or greater than 1, the deleting unit is configured to:

compare several pieces of engine control data of the nth engine-control data string with corresponding several pieces of engine control data of an (n+1)th engine-control data string, the several pieces of engine control data of the nth engine-control data string being transferred to be stored in the memory unit after the piece of engine control data of each of the plurality of engine-control data strings identified by the identifier is transferred to be stored therein, the corresponding several pieces of engine control data of the (n+1)th engine-control data string including a leading piece of engine control data of the (n+1)th engine-control data string and at least one piece of engine control data following the leading piece thereof; and when it is determined that at least one piece of the several pieces of engine control data of the nth engine-control data string is matched with at least one piece of the several pieces of engine control data of the (n+1)th engine-control data string based on the comparison result, delete, as the at least one overlapped redundant item, the at least one piece of the several pieces of engine control data of the nth engine-control data string.

9. A data processor according to claim 8, further comprising:

an abnormality determining unit configured to determine that an abnormality occurs in the transfer of each of the engine-control data stirrings to the memory unit when it is determined that any one of the several pieces of engine control data of the nth engine-control data string are mismatched with the several pieces of engine control data of the (n+1)th engine-control data string based on the comparison result.

10. A data processor according to claim 6, wherein the at least one piece of engine control data overlappedly transferred by each pair of successively activated data transferring units in the plurality of data transferring units consists of three or more pieces of engine control data.

11. A data processor according to claim 6, wherein the plurality of pieces of engine control data successively input to the data processor at the constant intervals are obtained by sampling, at the constant intervals, discrete values from an electric signal indicative of a pressure in a cylinder of the engine and by converting the individual sampled values into the plurality of pieces of engine control data, respectively, and the constant intervals each being determined to be shorter than one minimum cycle of a pulse train of a rotation signal whose a significant edge appears each time the crankshaft rotates at a predetermined angle, further comprising:

an edge time storing unit configured to store a time value each time the significant edge appears in the rotation signal the time value identifiably corresponds to which rotation angle of the crankshaft;

a start time storing unit configured to store a time value when one of the plurality of pieces of engine control data is transferred for the first time to the memory unit within the predetermined time frame; and an obtaining unit configured to obtain a plurality of items of engine control data at constant angular intervals of the crankshaft based on each of the time values stored by the edge time storing unit, the start time stored by the start time storing unit, the constant intervals, and the plurality of pieces of engine control data from which the at least one overlapped redundant item is deleted stored in the memory unit, each of the constant angular intervals of the crankshaft being smaller than the predetermined angle.

12. An engine control unit comprising:

the data processor according to claim 3; and a controller configured to control an engine based on the plurality of pieces engine control data stored in the memory unit.

13. A program product embedded in a media accessible by a computer accessible to a memory unit and to a plurality of data transferring units for transferring data, the computer working to process a plurality of pieces of engine control data successively sampled at constant intervals, the constant intervals each being determined to be associated with a rotation angle of a crankshaft of an engine, each of the plurality of data transferring units having an upper limit to a number of data items successively transferable when activated, the program product comprising:

first means for instructing the computer to successively activate, within a predetermined time frame, the plurality of data transferring units without all of the plurality of data transferring units being deactivated within the predetermined time frame to thereby successively transfer the plurality of pieces of engine control data to the memory unit; and second means for instructing the computer to store the plurality of pieces engine control data in the memory unit.

14. A program product according to claim 13, wherein the first means is configured to instruct the computer to successively activate, within the predetermined time frame, the plurality of data transferring units while an activation duration of each of the plurality of data transferring units is partially overlapped with that of another one of the plurality of data transferring units, another one of the plurality of data transferring units being activated next to activation of each of the plurality of data transferring units.

* * * * *